(12) United States Patent
Klee et al.

(10) Patent No.: US 9,687,737 B2
(45) Date of Patent: Jun. 27, 2017

(54) METHODS AND SYSTEMS FOR DYNAMICALLY ADJUSTING UPDATE RATES IN MULTI-PLAYER NETWORK GAMING

(71) Applicant: Sony Interactive Entertainment America LLC, San Mateo, CA (US)

(72) Inventors: Nathan Scott Klee, Kirkland, WA (US); Fraser Hutchinson, Kirkland, WA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 491 days.

(21) Appl. No.: 14/017,147

(22) Filed: Sep. 3, 2013

(65) Prior Publication Data
US 2014/0073424 A1    Mar. 13, 2014

Related U.S. Application Data

(63) Continuation of application No. 12/408,635, filed on Mar. 20, 2009, now Pat. No. 8,527,657.

(51) Int. Cl.
*A63F 13/30*        (2014.01)
*A63F 13/358*       (2014.01)

(52) U.S. Cl.
CPC ............ *A63F 13/358* (2014.09); *A63F 13/30* (2014.09); *A63F 2300/534* (2013.01)

(58) Field of Classification Search
CPC .... H04L 67/1059; H04L 67/104; A63F 13/12; A63F 2300/407; A63F 2300/408
USPC .... 463/40–42; 709/240, 205, 207, 231, 244, 709/248
See application file for complete search history.

(56) References Cited

U.S. PATENT DOCUMENTS 6,826,523 B1 * 11/2004 Guy et al. ............... A63F 13/12
                                                    703/22

* cited by examiner

*Primary Examiner* — David L Lewis
*Assistant Examiner* — Ross Williams
(74) *Attorney, Agent, or Firm* — Martine Penilla Group, LLP

(57) ABSTRACT

In a server-implemented video game, a method for providing updates to a remote client regarding a plurality of objects located in a virtual space of the video game. The method comprises operations of receiving an update locus from the remote client, the update locus indicating a client-specified position within the virtual space of the video game; determining a distance of each of the plurality of objects from the update locus; determining an update rate for each of the plurality of objects based upon their determined distances; and sending updates regarding each of the plurality of objects to the remote client according to the determined update rates.

19 Claims, 24 Drawing Sheets

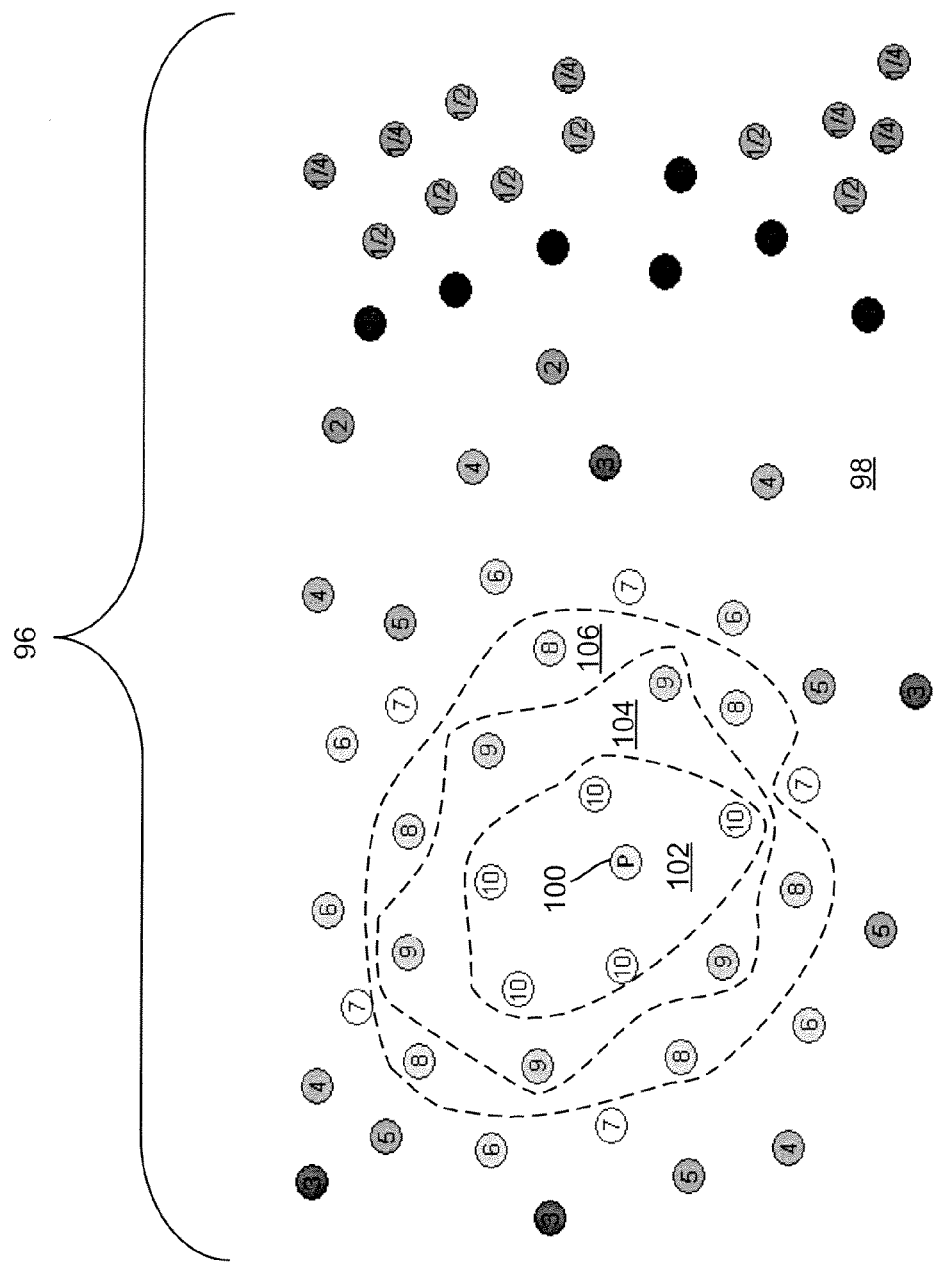

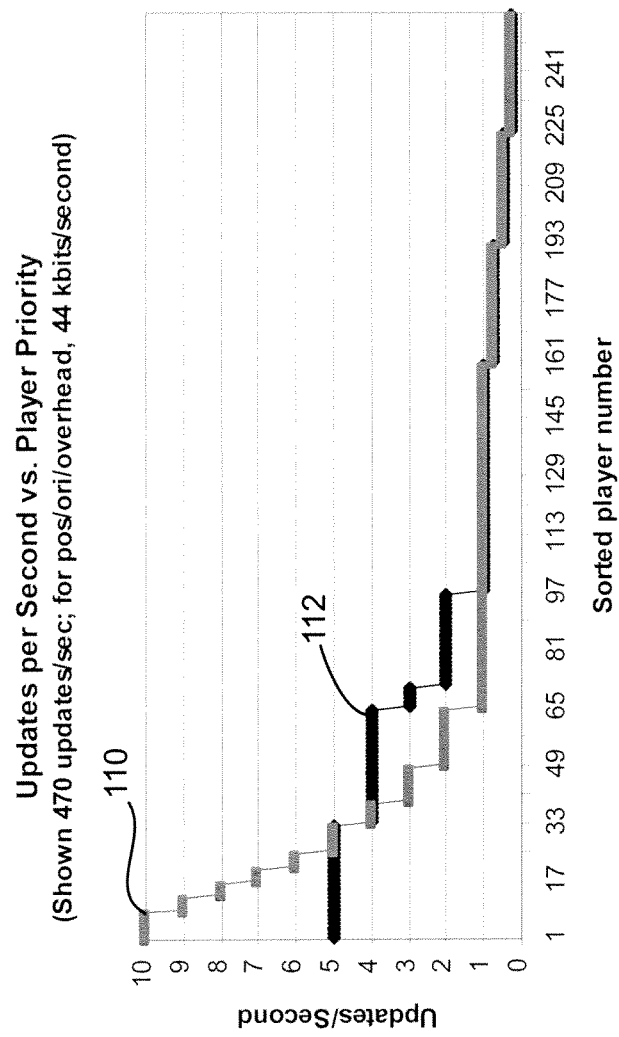

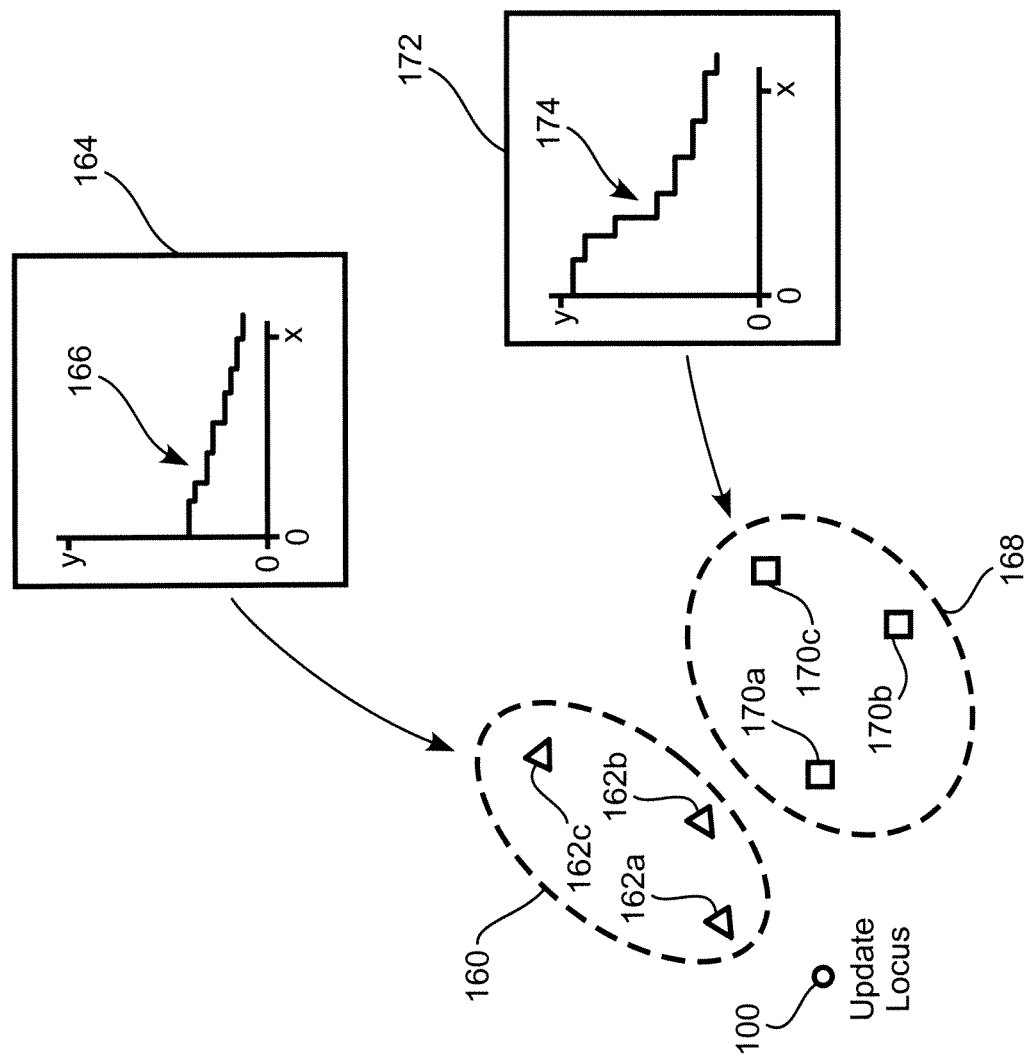

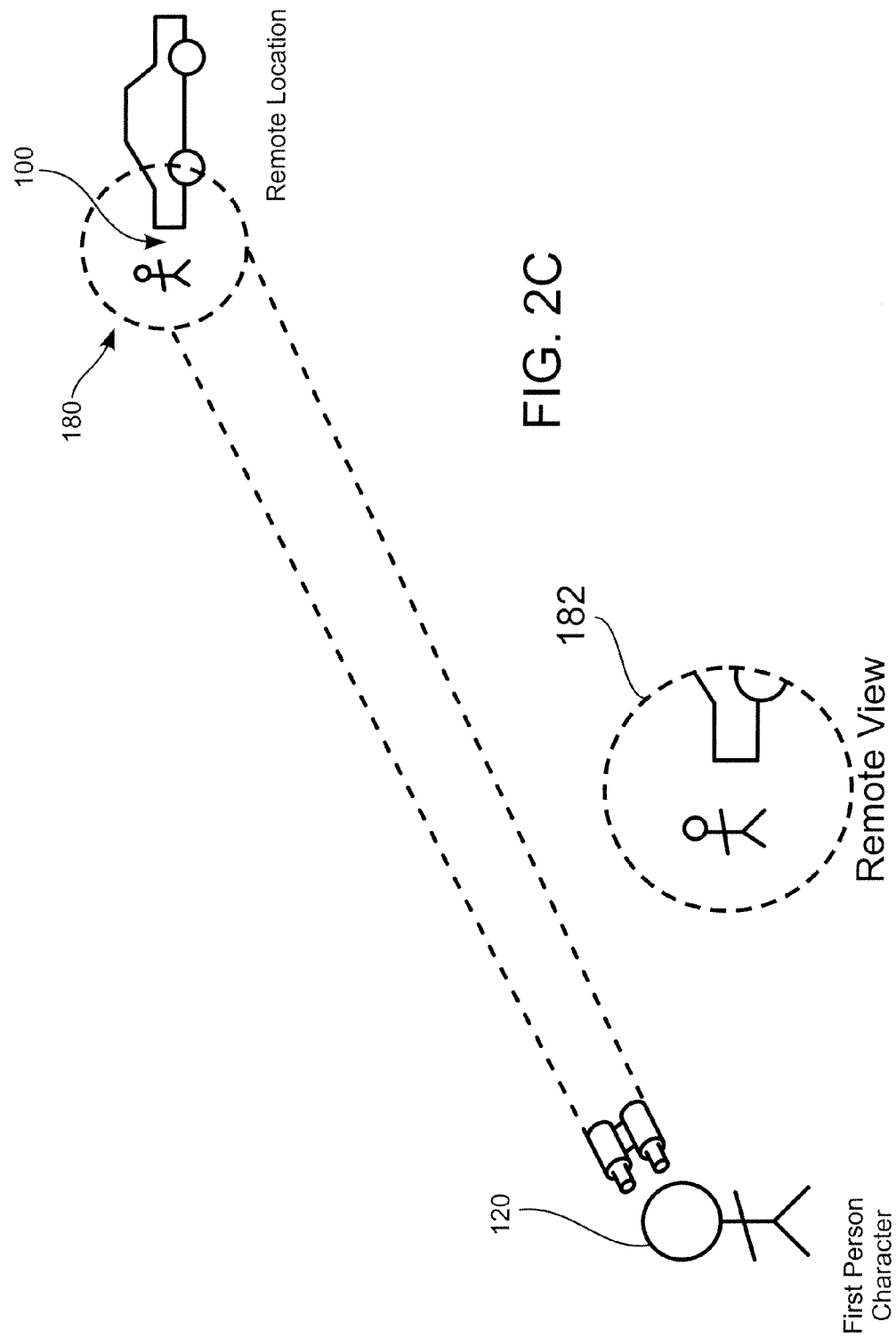

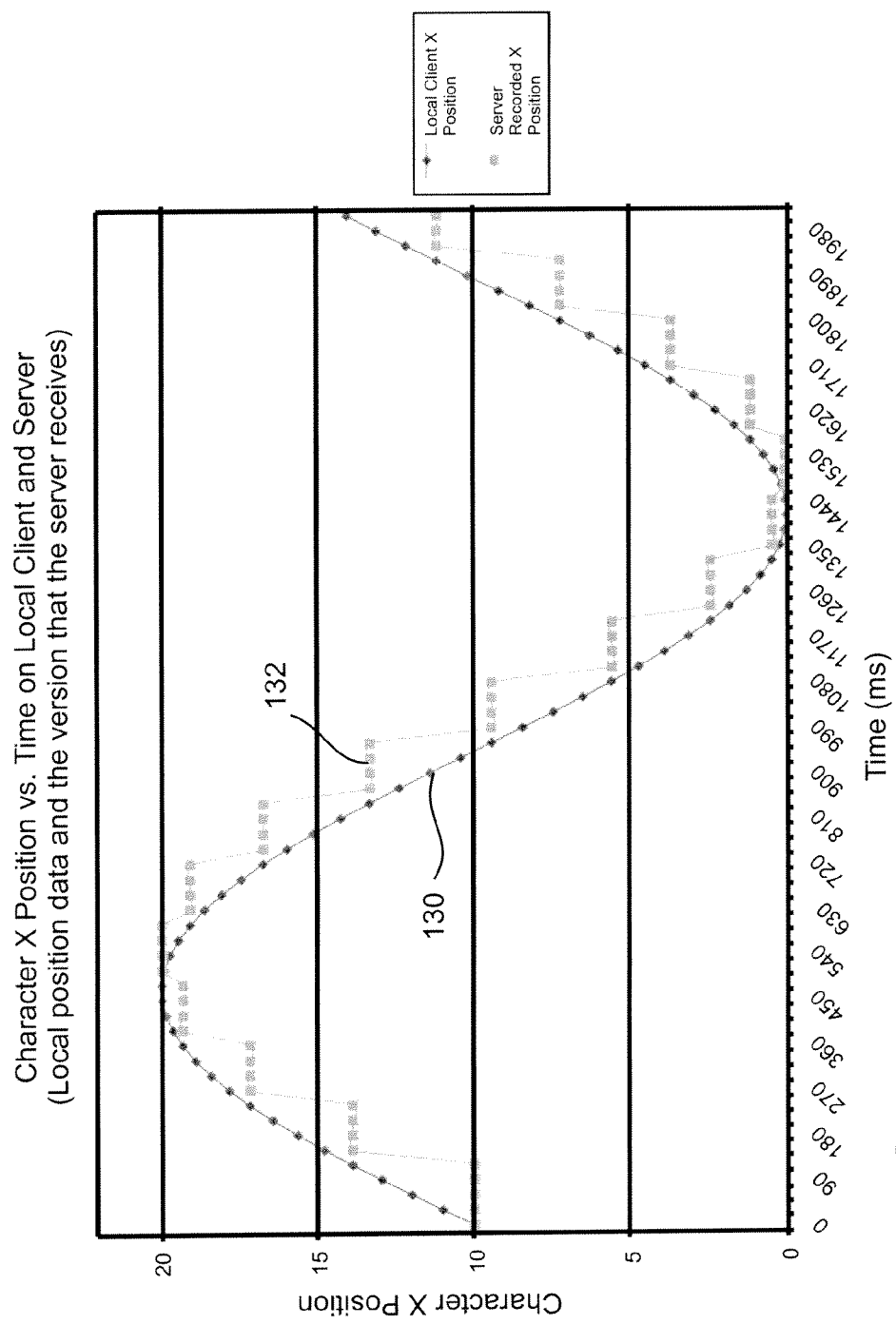

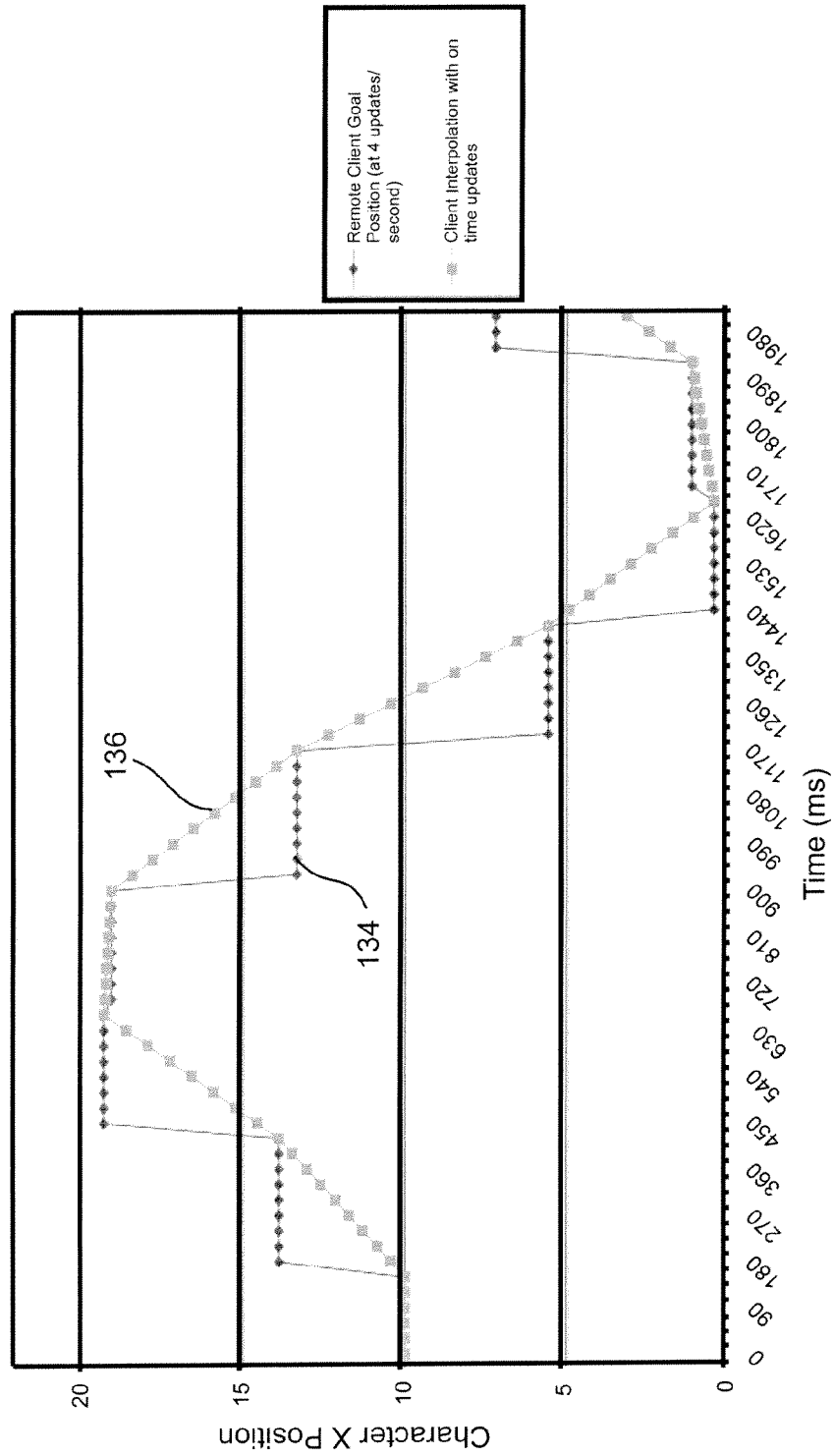

METHODS AND SYSTEMS FOR DYNAMICALLY ADJUSTING UPDATE RATES IN MULTI-PLAYER NETWORK GAMING

CLAIM OF PRIORITY

This application claims priority as a continuation of U.S. application Ser. No. 12/408,635, (issued as U.S. Pat. No. 8,527,657), entitled "Methods and Systems for Dynamically Adjusting Update Rates in Multi-Player Network Gaming," the disclosure of which is incorporated by reference herein.

BACKGROUND

Many of today's games and simulations facilitate multiple players simultaneously participating in the same instance of the game. The multiplayer aspect of such games provides an enriched gaming experience, wherein players may communicate, collaborate, compete against one another, and/or otherwise interact with and affect each other and their shared collective gaming environment. The players in a multiplayer game may be connected via a network, such as a local area network (LAN), a wide area network (WAN), or the internet.

In order for players in a networked multiplayer game to interact in a sensible manner, they must constantly send to each other updates about the state of objects in the game. For example, one player may move his character's position from a first position to a second position, and this position change must be communicated to the other players in a timely fashion in order for the game to proceed in a realistic manner. Naturally, as the number of players in a game increases, so the amount of state change information being generated and sent from each player to every other player will increase linearly with player count. This means that a 256 player game will require roughly eight times as much bandwidth as a 32 player game.

However, bandwidth is not an unlimited resource, and players typically have predetermined bandwidth limitations depending on the nature of their network connections. These bandwidth limitations may be directly regulated by internet service providers (ISPs) or result from other factors such as the type of networking equipment utilized by a given user. Hence, under conventional methods, facilitating a large number of players in the same networked multiplayer game can be problematic because a substantial amount of bandwidth will be required to facilitate smooth game play.

In sum, there is a need for a method to accommodate a large number of players in a networked multiplayer game, while maintaining a quality gaming experience for each player despite limited bandwidth. It is in this context that embodiments in accordance with the invention arise.

SUMMARY

The present invention relates to a method for providing updates to a remote client regarding a plurality of objects located in a virtual spatial field of a video game or simulation implemented on a server. In a multiplayer network environment, there will be many remote clients which communicate with a server, and the updates provided to each client are specific to that client, depending on the position of objects and or other players. In specific embodiments, the custom update rates for each client are of particular usefulness in massive multiplayer network game applications, where infrequent updates can add to lag time and delay and adversely impact the user experience. It should be appreciated that the present invention can be implemented in numerous ways, such as a process, an apparatus, a system, a device or be embodied as a product on a computer readable medium. Several inventive embodiments of the present invention are described below.

In one embodiment, a method for providing updates to a remote client from a server includes the following method operations. First, an update locus is received from the remote client, wherein the update locus indicates a client-specified position within the virtual spatial field of the server-implemented simulation. Then, a distance of each of the plurality of objects from the update locus is determined. Next, a plurality of objects is sorted according to their determined distances from the update locus. And an update rate is determined for each of the plurality of objects based upon their sorted order. Then, updates regarding each of the plurality of objects are sent to the remote client from the server according to the determined update rates.

In one embodiment, the update rate of each of the plurality of objects decreases as distance from the update locus increases. In another embodiment, the sorted plurality of objects are divided into consecutive non-overlapping cohorts, and an update rate is determined for each cohort such that the update rate decreases as distance of the cohort from the update locus increases. In various embodiments, a data bandwidth required for the sending of the updates does not exceed a predetermined data bandwidth limit.

In one embodiment, a minimum update rate and a maximum update rate are adjusted based on a density of the plurality of objects, such that a difference between the minimum update rate and the maximum update rate decreases as the density of the plurality of objects increases.

In one embodiment, the client-specified position is the position of a first-person character or a third-person character of a player of the video game. In another embodiment, the client-specified position is the position of a point of interest of a player of the video game.

In one embodiment, the plurality of objects includes one or more classes of objects. An update rate profile for each class of objects is determined which indicates the update rate of a given object based on its relative distance from the update locus within its class. Thus, the plurality of objects are sorted by class according to their determined distances from the update locus. The update rate for each of the plurality of objects is then determined based upon its class and update rate profile.

In one embodiment, updates are sent for a given object according to its determined update rate only when the given object exhibits a changed status from the status of its previously sent update.

In one embodiment, in a video game or simulation implemented on a server-client system, a method for receiving updates from a server at a client is provided. The updates pertain to a plurality of objects located in a virtual spatial field of the simulation. The method comprises the following operations. First, an update locus of the client is provided to the server, wherein the update locus indicates a client-specified position within the virtual spatial field of the video game. Then, a distance of each of the plurality of objects from the update locus is determined. Next, the plurality of objects is sorted according to their determined distances from the update locus. And an update rate for each of the plurality of objects based upon their sorted order is determined. Then, updates regarding each of the plurality of objects from the server are received at the client according to the determined update rates.

In one embodiment, at the client, a transformation of each of the plurality of objects from a current state to an updated state is interpolated. The interpolated rate of transformation is based upon the update rate of the object. In one embodiment, the current and updated states may indicate current and updated positions for each of the plurality of objects.

In one embodiment, the transformation to the updated state is completed at approximately the expected time of the next update. In another embodiment, the transformation to the updated state is completed at a time interval after the expected time of the next update. In one embodiment, the time interval is in the range of approximately 20 to 40 milliseconds.

In one embodiment, a video game system is provided, comprising a server for hosting a server-based video game. The server-based video game includes a plurality of server objects, and update rates for each of the server objects, wherein the update rate of a given server object determines a rate at which a current state of the given server object is sent to the client. The system further comprises a client for hosting a client-based video game corresponding to the server-based video game. The client-based video game includes a plurality of client objects corresponding to the plurality of server objects, wherein each client object is updated with the received current state of its corresponding server object. The server is configured to receive an update locus from the client, which indicates a client-specified position within both the server-based video game and the client-based video game. The update rates for each of the plurality of server objects are based upon a distance of each of the plurality of server objects from the update locus.

In one embodiment, each of the plurality of server objects and each of the plurality of client objects includes one or more fields, and each field contains data regarding a property of its respective object.

In one embodiment, the simulation system includes a server object manager. The server object manager manages the plurality of server objects. Further included is a client object manager for managing the plurality of client objects.

In one embodiment, the simulation system includes a server object aggregator for aggregating and sending data to the client.

In one embodiment, a computer program product is provided for providing updates to a remote client regarding a plurality of objects located in a virtual spatial field of a video game. The computer program product is embodied on a computer-readable medium, and is configured for execution by a computer. The computer program product includes program instructions for receiving an update locus from the remote client, the update locus indicating a client-specified position within the virtual spatial field of the server-implemented video game. Furthermore, program instructions are provided for determining a distance of each of the plurality of objects from the update locus, and for sorting the plurality of objects according to their determined distances from the update locus. Moreover, the computer program product includes program instructions for determining an update rate for each of the plurality of objects based upon their sorted order. And it also includes program instructions for sending updates regarding each of the plurality of objects to the remote client according to the determined update rates, the determined update rates being applied to the plurality of objects to provide a representation on a display.

In one embodiment, the computer program product is configured so that the update rate of each of the plurality of objects decreases as distance from the update locus increases.

In one embodiment, the computer program product is configured such that the sorted plurality of objects are divided into consecutive non-overlapping cohorts. As such, an update rate for each cohort is determined such that the update rate decreases as distance of the cohort from the update locus increases.

In one embodiment, the computer program product is configured to adjust a minimum update rate and a maximum update rate based on a density of the plurality of objects such that a difference between the minimum update rate and the maximum update rate decreases as the density of the plurality of objects increases.

In one embodiment, the computer program product is configured such that the plurality of objects includes one or more classes of objects. Furthermore, the computer program product includes program instructions for determining an update rate profile for each class of objects, the update rate profile indicating the update rate of a given object based on its relative distance from the update locus within its class. Thus, the program instructions for sorting the plurality of objects further includes program instructions for sorting the objects of each class according to their determined distances from the update locus. And the program instructions for determining an update rate further comprises program instructions for determining an update rate for each of the plurality of objects based upon its class and update rate profile.

In one embodiment, the computer program product is configured so that the program instructions for sending updates further comprises program instructions for sending an update for a given object according to its determined update rate only when the given object exhibits a changed status from the status of its previously sent update.

BRIEF DESCRIPTION OF DRAWINGS

The present invention will be readily understood by the following detailed description in conjunction with the accompanying drawings. To facilitate this description, like reference numerals designate like structural elements.

FIG. 1 illustrates a graphical representation of a plurality of objects in a virtual spatial field, in accordance with an embodiment of the invention.

FIG. 2A illustrates a graph showing updates/second vs. sorted player number for a simulation having a plurality of players, in accordance with an embodiment of the invention.

FIG. 2B illustrates multiple classes of objects surrounding an update locus, in accordance with an embodiment of the invention.

FIG. 2C illustrates an update locus situated at a remote view of a first-person character, in accordance with an embodiment of the invention.

FIGS. 5A-5I illustrate multiple graphs demonstrating both linear and non-linear interpolation methods, and the effects of various update timing scenarios, in accordance with embodiments of the invention.

DETAILED DESCRIPTION

Figure 3A:
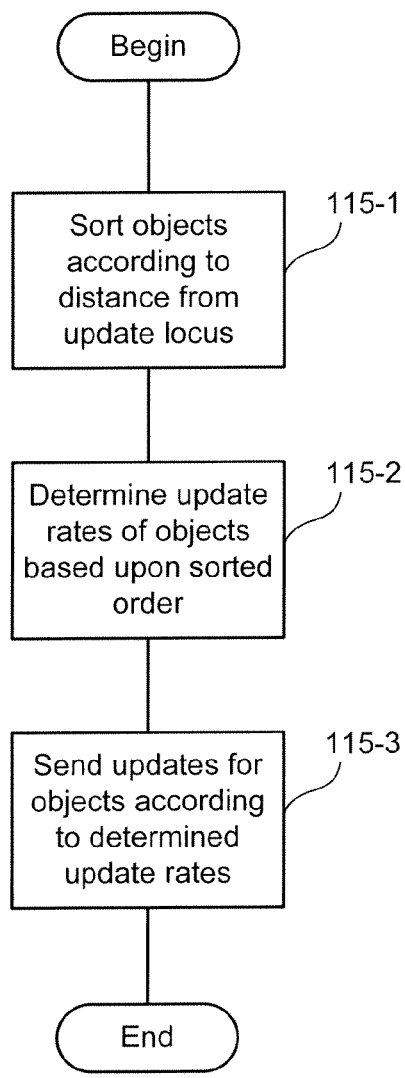
FIG. 3A illustrates a method for sending updates regarding a plurality of objects, in accordance with an embodiment of the invention.

Broadly speaking, the invention defines methods and systems for providing updates to a remote host regarding objects located in a virtual spatial field of a game or simulation. Various embodiments of the invention provide for efficient use of limited bandwidth resources while enabling updates to be sent or received regarding a large number of objects. In one embodiment, objects in a virtual spatial field are sorted according to distance from an update locus. Update rates for the objects are determined based on the sorted order which determines each object's relative distance from the update locus. Update rates are determined such that update rate decreases as the distance from the update locus increases.

With reference to FIG. 1 a graphical representation is shown of a plurality of objects 96 in a virtual spatial field 98. The virtual spatial field 98 as shown is a two-dimensional space. However, it is recognized that in other embodiments, the virtual spatial field 98 may be a three-dimensional or one-dimensional space. The methods herein described with reference to the two-dimensional virtual spatial field 98 are readily applied to three-dimensional and one-dimensional spaces, and the details of such embodiments need not be described, as it is understood that such embodiments are within the scope of the present invention. An update locus 100 is a point of interest within the virtual spatial field 98, about which updates regarding the plurality of objects 96 are to be prioritized. The update locus may be the position of one of the plurality of objects, or may be an arbitrarily selected point within the virtual spatial field 98. The update locus 100 may be a static point within the virtual spatial field 98, or may be dynamically changing depending on the context in which the presently described methods are applied.

In one embodiment, the plurality of objects 96 are organized into cohorts or groups based upon their distance from the update locus 100. Thus, as shown by way of example in FIG. 1, the five nearest objects to the update locus 100 constitute a first cohort 102. The next five nearest objects to the update locus 100 constitute a second cohort 104. The next six nearest objects to the update locus 100 constitute a third cohort 106. This process may be repeated as necessary until all of the objects in the plurality of objects 96 are organized into cohorts based upon their distance from the update locus 100. The number of objects in a particular cohort may be tailored as desired depending upon the particular application. In one embodiment, each of the cohorts has approximately the same number of objects. In another embodiment, the number of objects in a cohort decreases as the distance of the cohort from the update locus increases. In another embodiment, the number of objects in a cohort increases as the distance of the cohort from the update locus increases. In still other embodiments, the number of objects in each cohort does not follow a particular distance-based pattern, but is arbitrarily chosen due to particular needs or constraints (e.g. constraints of a game, action sequence, stage in a game, etc.).

With continued reference to FIG. 1, an update rate is determined for the objects in a given cohort based on the distance of the cohort from the update locus 100. The update rate of an object determines the frequency with which updates regarding that particular object are sent out to a receiving entity (such as a client machine in a server-client system). The update being sent out is typically data pertaining to a state of the object, such as its current position, or the value of a property or field of the object. By way of example, the objects in the first cohort 102 may all have an update rate of 10 updates per second. Whereas, the objects in the second cohort 104 may have an update rate of 9 updates per second; and the objects in the third cohort 106 may have an update rate of 8 updates per second. Additional cohorts which encompass the remainder of the plurality of objects 96 (not shown in FIG. 1 due to redundancy) are configured such that the update rate of objects in a cohort decreases as distance from the update locus 100 increases. Because updates regarding the objects are sent out at a frequency which decreases with distance, a receiving entity of the updates will "know" the status of those objects closest to the update locus 100 with the greatest fidelity. Conversely, the receiving entity will know the status of objects farthest away from the update locus 100 with the least fidelity. In this manner, data bandwidth which is required for the sending of the updates may be conserved, as the updates regarding the plurality of objects are prioritized relative to the update locus 100, rather than simply being provided at a constant frequency for all objects regardless of distance from the update locus 100.

The arrangement of update rates for each cohort may vary as required for a particular application. In one embodiment, the update rate decreases linearly with relative distance of the cohort from the update locus 100. In other embodiments, the update rates for the various cohorts may decrease according to a predetermined mathematical function or as defined by a predefined increment. In one such embodiment, the update rate of a cohort may be inversely proportional to its relative distance from the update locus 100. Thus, by way of example, the update rate of a cohort may take the form max_update_rate/x, where max_update_rate equals the maximum update rate desired, and x equals the relative order of the cohort by distance from the update locus 100. For example, if max_update_rate is set to 10 updates/second, then the first cohort will have 10/1, or 10 updates/second, the second cohort will have 10/2, or 5 updates/second, the third cohort will have 10/3, or 3.33 updates/second, etc. In other embodiments, the update rate may decrease according to a logarithmic or other predetermined mathematical function. In some embodiments, the update rates of the cohorts may decrease in accordance with the actual distance of the cohort from the update locus 100, where the actual distance of the cohort is a measure of the distance of the cohort as a whole from the update locus 100. In one embodiment, the distance of a cohort from the update locus 100 may be calculated, by way of example only, by taking the average of the distances of the objects within that cohort from the update locus 100. In another embodiment, the distance of a cohort from the update locus 100 is calculated by determining the median of the distances of the objects within that cohort from the update locus 100. In still other embodiments of the invention, the update rates of the cohorts may be arbitrarily selected according to a predetermined pattern, wherein overall, the update rate of a cohort decreases as distance from the update locus 100 increases. Furthermore, in all such embodiments, it may be the case that beyond a certain cohort, all remaining cohorts have an update rate of zero.

In various embodiments, both the size of the cohorts as well as the update rates may be selected according to the same relational schema. In some embodiments, the size of the cohorts and the update rates of those cohorts are determined by approximating a mathematical function. Various mathematical formulations and methods which are known in the art may be applied to ultimately select appropriate cohort sizes and update rates for the various cohorts.

In the context of a game or simulation, the plurality of objects may represent any number of types of entities, such as players, vehicles, buildings, weapons, grenades, etc. However, these are provided by way of example only, and are not intended to limit the scope of the invention. It is recognized that the plurality of objects shown may represent any other type of entity for which a distance from an update locus may be determined.

In another embodiment, it is recognized that an update for a particular object need not be sent unless a status of that particular object has changed. Therefore, in accordance with such an embodiment, the aforementioned update rates may constitute maximum update rates for the plurality of objects 96. The update rates represent maximum rates because the actual rate at which updates are sent for a particular object may be less than the determined maximum update rate for that object, depending upon the frequency of changes in status of that object. Regardless of the determined maximum update rate, no actual update is sent unless the object exhibits a changed status from the previously sent update. Thus, by way of example, if an object's status never changes, then its maximum update rate may be a positive value, but the actual rate at which updates regarding the object are sent out will be essentially zero. Conversely, if an object's status is constantly changing, then the actual rate at which updates are sent out will equal the determined maximum update rate of the object.

It is further recognized that methods similar to those presently described may be applied, but without the organization of the plurality of objects into cohorts or groups. Therefore, in various alternative embodiments of the invention, update rates for each of the plurality of objects 96 are determined according to a predetermined schema, wherein the update rate of a given object in the plurality of objects 96 decreases as the distance of the object from the update locus 100 increases. In one embodiment, the plurality of objects 96 is sorted according to distance from the update locus 100. Update rates are then determined for each object based on the sorted order, such that the update rate decreases linearly with relative distance from the update locus 100. In other embodiments, the update rate is determined to be inversely proportional to the relative ordering of the object by distance. In other embodiments, the update rate is calculated according to a predetermined mathematical function. In still other embodiments, the update rate decreases according to an arbitrarily predetermined schema. In various alternative embodiments, the update rate is determined based upon the actual distance of each object from the update locus 100.

Additionally, it is recognized that in further embodiments of the invention, each of the plurality of objects 96 may constitute an update locus. Thus for each given object that constitutes an update locus, the remaining objects are those objects for which updates regarding their status are received. Thus, the remaining objects are ordered based upon distance from the selected object which constitutes the update locus, and update rates are determined based on this sorted ordering of the remaining objects.

In the context of a massively multiplayer online (MMO) game, some of the objects may be characters representative of the players of the game. Thus, each player of the MMO may have a character which can constitute an update locus for the purpose of receiving updates regarding the remaining objects in the MMO game. Furthermore, the update locus may be a selected point of interest within the game.

For example, it may be desirable to provide the game with an observation feature, which allows a person to act as an observer of the gameplay without actually participating in the game itself. The observer could determine a location within the game from which to observe the gameplay; this location would determine the update locus utilized for purposes of determining update rates for the person's client machine. The location could be movable, thus enabling the observer to shift views of the game. And as the view is shifted, so the update locus for the person's client machine is adjusted accordingly.

In a similar manner, particular features of the video game may result in selection of an update locus apart from the location of a player's first-person character. For example, this may occur if the game offers a feature which causes translocation of the player's view of the game, such as may be the case when using a sniper scope, binoculars, or some other feature which allows a player to select a remote viewpoint within the spatial field of the game that is separate from the location of the player's first-person character. In such a case, when the player opts to use such a feature, then the update locus may be changed to the location of the new viewpoint, or in other instances, to approximately the center of the translocated view area.

FIG. 2A illustrates a graph showing updates/second vs. sorted player number for a simulation having a plurality of players, in accordance with an embodiment of the invention. The x-axis indicates sorted player number, which is determined by sorting players based upon their distance from an update locus. In the graph shown, 256 players have been sorted, such that player number 1 is the closest to the update locus, and player number 256 is the farthest from the update locus. Two curves 110 and 112 are provided, which demonstrate different ways of setting the cohort sizes and the corresponding update rates. Curve 110 has a maximum update rate of 10 updates/second, this rate being applied to its first cohort of players; whereas curve 112 has a maximum update rate of 5 updates/second, this rate being applied to its corresponding first cohort of players. According to curve 110, players 1-25 would have higher update rates (ranging from 6-10 updates/second) than they would have according to curve 112 (players 1-25 all set at 5 updates/second). However, for players 39-96, the opposite is true, wherein the update rates according to curve 110 (ranging from one to 3 updates/second) are less than they would be according to curve 112 (ranging from 2 to 4 updates/second).

Visually illustrated, the curve 110 exhibits a "steeper" relationship between update rate and sorted player number than that of curve 112. The area under each of curves 110 and 112 is representative of the total bandwidth utilized according to each curve. As shown in FIG. 2, the area under curve 110 is equal to the area under curve 112. Hence, the assignment of cohorts and update rates in accordance with either curve 110 or curve 112 will require the same amount of bandwidth. This is merely demonstrative of how the curve of update rate vs. sorted player number may be tuned or adjusted so as to utilize a given bandwidth allocation as desired. Thus, from the standpoint of a receiving entity of the updates regarding the players, according to curve 110, players closest to the update locus are presented with greater fidelity (higher frequency update rates) than according to curve 112. However, the trade-off for this increased fidelity is that mid-range players according to curve 110 are presented with less fidelity than they would be under curve 112.

With reference to FIG. 2B, multiple classes of objects surrounding an update locus 100 are shown, in accordance with an embodiment of the invention. A class of objects 160 defines a first class of objects, which as shown by way of example only, includes objects 162*a*, 162*b*, and 162*c*. Likewise, a class of objects 168 defines a second class of objects which includes, by way of example, objects 170*a*, 170*b*, and 170*c*. The objects 160 have an update rate profile which is illustrated at graph 164 by the curve 166. The horizontal axis of graph 164 represents the sorted ordering of the objects of class 160 based on distance from the update locus, whereas the vertical axis of graph 164 represents the update rate. In a similar manner, the curve 174 shown at graph 172 illustrates the update rate profile for the class of objects 168. A comparison of curves 166 and 174 generally illustrates that the class of objects 160 have lower update rates than the class of objects 168. Thus, even though object 162*a* (which is the object of class 160 nearest to the update locus), is spatially closer to the update locus 100 than object 170*a* (object of class 168 nearest to the update locus), the object 162*a* in fact has a lower update rate than object 170*a* due to the differing update rate profiles of classes 160 and 168.

The foregoing embodiment has been described in terms of two classes of objects for ease of reference. However, it is recognized that any number of classes of objects may exist for the purposes herein described. And any number of objects may belong to a given class of objects. Each class of objects may have its own particular update rate profile which details the update rate for a given object based on its relative distance from the update locus in relation to the other objects of its class. Accordingly, the update rate profile of each class of objects may be customized as desired depending upon the relative importance of different classes of objects as they relate to the update locus, as well as the relative importance of objects within a particular class. Classes of objects having greater importance in relation to the update locus will overall have higher update rates than classes of lower importance relative to the update locus. And for a given class of objects, the update rate profile may be tuned to produce update characteristics ranging from no difference at all amongst the objects to marked differences in update rates based on relative distance from the update locus.

Accordingly, in the context of a video game or simulation, there may be many different classes of objects, each of which has its own update rate profile. Examples of classes of objects include characters, vehicles, weapons, enemies, friendlies, buildings, structures, and any other type of entity which may exhibit status changes within the video game and so require updates to be sent to client machines. By utilizing different update rate profiles for different classes of objects, it is possible to prioritize the different classes of objects in relation to the update locus. For example, in a game wherein the update locus is the first-person character of a player, it may be more important for the player to know the status of enemies than that of friendlies. Hence the update rate profile for enemies will generally exhibit higher update rates than the update rate profile for friendlies. Or as another example, it may be very important to the player to know with high fidelity the status of vehicles or weapons having long-range strike capabilities, such as tanks or airplanes, and which therefore pose a direct threat to the player's character even from a great distance. Thus, for such classes of objects, the update rates will be very high. By contrast, it may be desirable to conserve bandwidth by setting very low update rates for classes of objects that pose little or no direct threat to the player's character, such as debris or other non-threatening objects which are movable or otherwise changeable to different states.

With reference to FIG. 2C, an update locus situated at a remote view of a first-person character is shown, in accordance with an embodiment of the invention. The first-person character 120 is directly controlled by a player of the video game. In normal gameplay, as in a first-person shooter type video game, the client update locus for the player is typically the location of the first-person character 120. However, it may be desirable to have the client update locus situated apart from the player's first-person character 120. As shown by way of example in FIG. 2C, the first-person character is able to view a remote location 180. By doing so, the player sees remote view 182 of the remote location 180 rather than the normal view which would be from the perspective of the first-person character 120. As the player's view is now distinct from the location of the first-person character 120, so the update locus 100 is set at the remote location 180, as it is the current area of interest for the player when viewing the remote view 182.

In various embodiments, the player may utilize, in the context of the video game, any of various viewing devices for the purpose of viewing remote location 180. Examples include binoculars, telescopes, sniper scopes, remote cameras, or any other non-fictional or fictional mechanism for initiating a remote view 182 of a remote location 180. The remote location 180 may or may not be viewable via line-of-sight from the location of the first-person character 120.

FIG. 3A illustrates a method for sending updates regarding a plurality of objects, in accordance with an embodiment of the invention. At operation 115-1, the plurality of objects is sorted according to distance from an update locus. At operation 115-2, update rates are determined for each of the objects based upon their sorted order, such that update rate decreases as relative distance from the update locus increases. At operation 115-3, updates are sent for each of the objects according to their determined update rates.

Figure 3B:
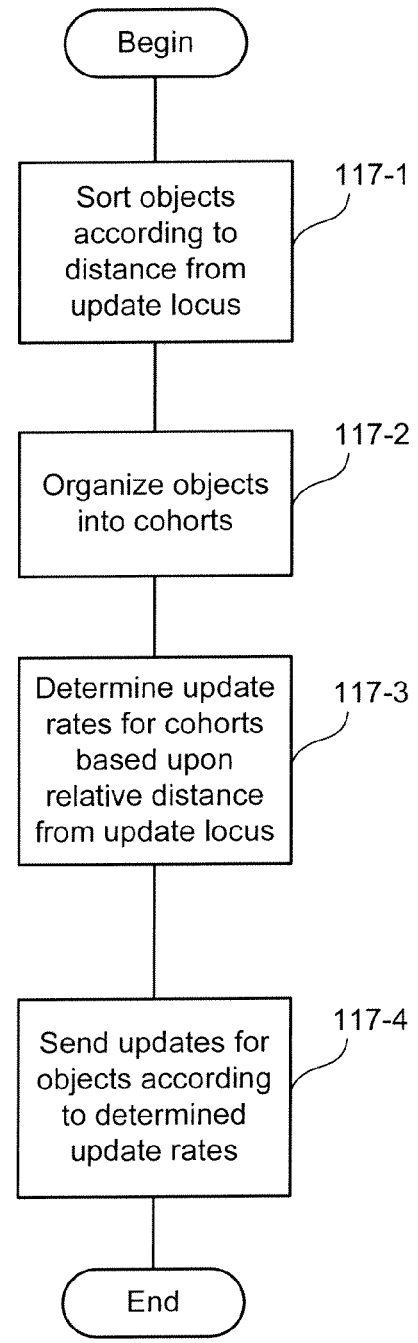
FIG. 3B illustrates a method for sending updates regarding a plurality of objects, in accordance with an embodiment of the invention.

FIG. 3B illustrates a method for sending updates regarding a plurality of objects, in accordance with an embodiment of the invention. At operation 117-1, the plurality of objects is sorted according to distance from an update locus. At operation 117-2, the sorted objects are divided into consecutive non-overlapping cohorts. At operation 117-3, update rates are determined for each of the cohorts based upon their relative distances from the update locus, such that update rate decreases as relative distance from the update locus increases. Each object in a given cohort is assigned the same update rate. At operation 117-4, updates are sent for each of the objects according to their determined update rates.

Figure 4A:
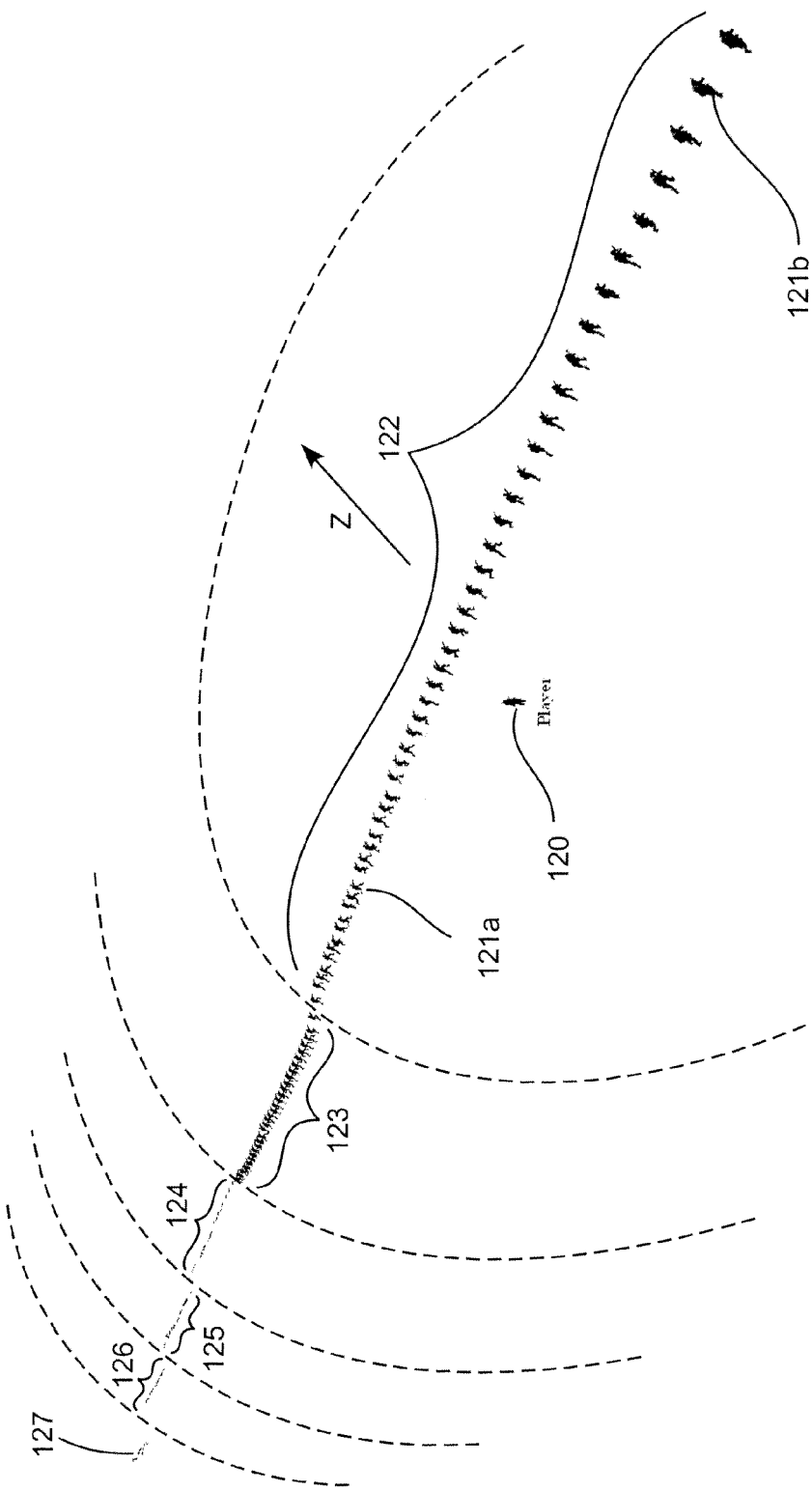
FIG. 4A is a graphical depiction of a line of players advancing across a field in a game or simulation, in accordance with an embodiment of the invention.

FIG. 4A is a graphical depiction showing a perspective view of a line of players advancing across a field in a game or simulation, in accordance with an embodiment of the invention. A player 120 standing apart from the line of players constitutes the position of an update locus. Due to the perspective view shown in FIG. 4, the players 121*a* and 121*b* are approximately equidistant from the player 120. The player 120 receives updates regarding each of the other players' positions. (It is understood that the graphical depiction of player 120 does not itself receive updates, but rather the entity represented by the graphical depiction of player 120, which may be an entity such as a client in a server-client system. However, for convenience and simplification with respect to FIG. 4, the graphical depictions of players will be referenced in the understanding that these are representative of computer-based entities.) The players in the line are broken down into groups or cohorts 122-127, each group having a specified update rate for each of the players in the group. The players nearest to the player 120 form group 122, whereas the second, third, fourth, fifth, and sixth nearest groups of players to player 120 form groups 123 to 127, respectively. The players in the line, though broken down into groups 122-127 for the purposes of providing updates to the player 120, are all advancing at the same rate according to their "true" positions, in the same direction Z. However, from the perspective of player 120, as shown in FIG. 4, they do not appear to be advancing at precisely the same rate because each group has a different update rate at which updates regarding the positions of the players in the group are being sent to player 120. The players in group 122 are nearest to player 120, which is the update locus, and therefore the players in group 122 have the highest update rate. Thus, player 120 will receive updates most frequently for group 122 and as a result, will perceive the players of group 122 at positions which are nearest to their true positions overall. Player 120 receives updates for group 123 at a lower rate than for group 122; and likewise receives updates at successively lower rates for groups 124-127. Therefore, the players in these more distant groups will be perceived by player 120 with less accuracy relative to their true positions overall. The end result is that the advancing line of players shown in FIG. 4 appears from the perspective of player 120 to move in segments, giving a somewhat wave-like appearance to the line of players.

The "true" position of a player is simply an authoritative position of the player. In the context of a server-client system, the true position may be known authoritatively only by the server, or by another client which controls that particular player. In one exemplary server-client system for operating a game or simulation, and in accordance with an embodiment of the invention, each client is authoritative for a player which is controlled by that client, whereas the server provides a centralized entity for receiving updates from and sending updates to the various clients.

Figure 4B:
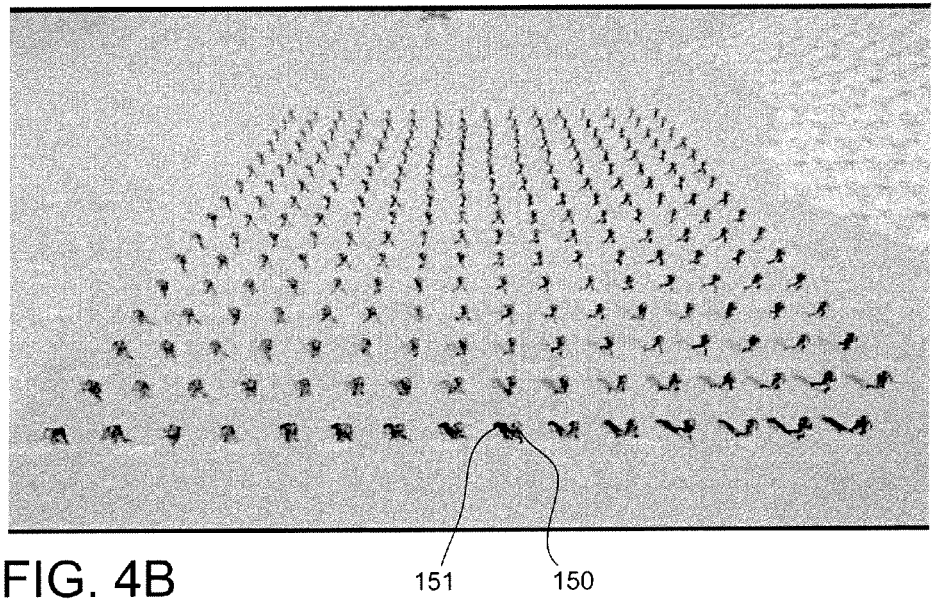
FIGS. 4B-4K illustrate series of frames illustrating a view of 255 players moving in a circular pattern.
Figure 4C:
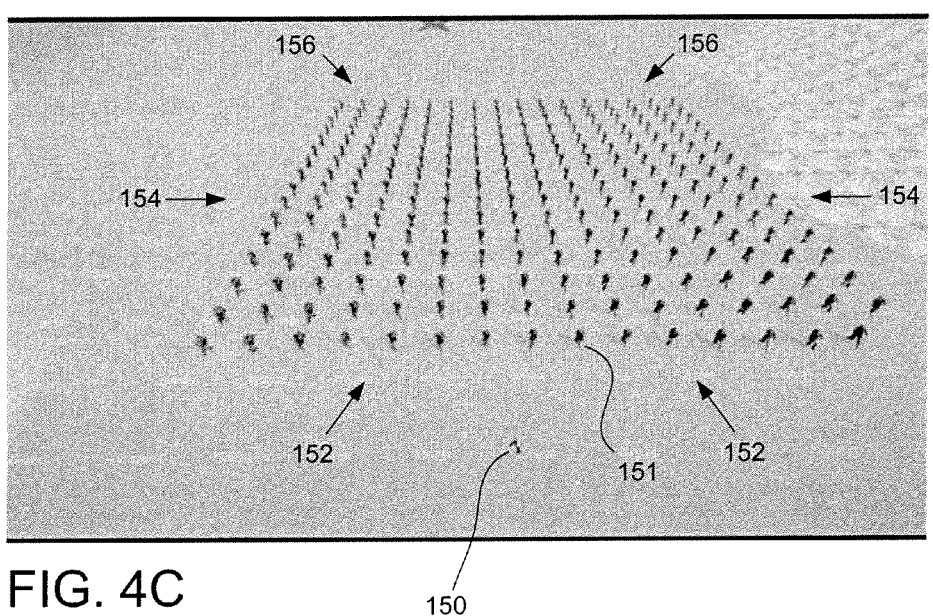
Figure 4D:
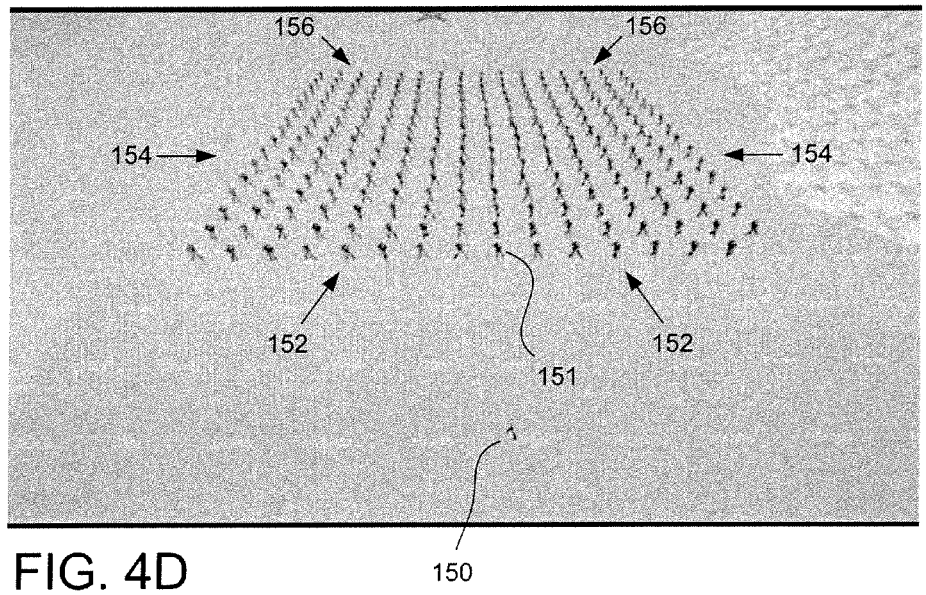
Figure 4E:
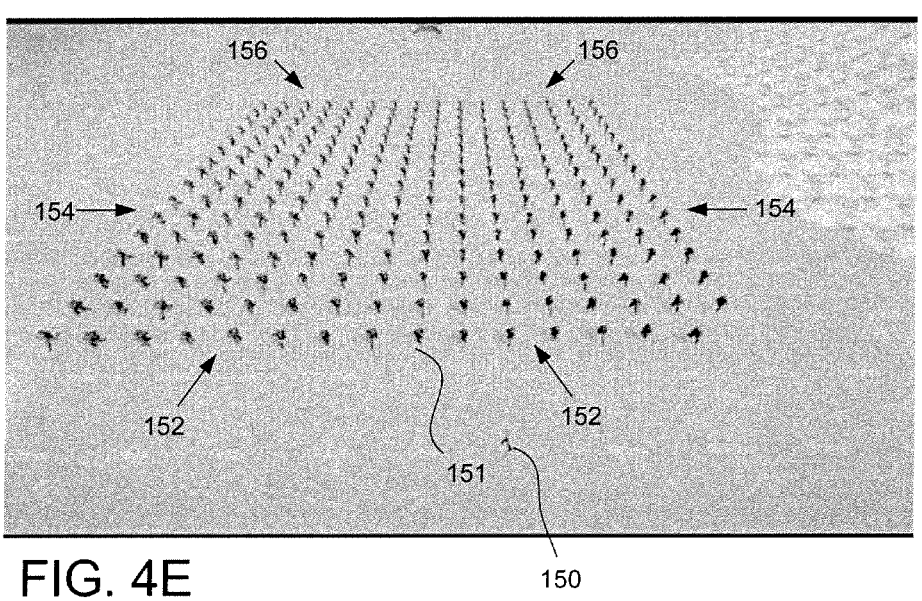

With reference to FIGS. 4B-4E, a series of frames illustrating a view of 255 players moving in a circular pattern is shown, as viewed from the perspective of an update locus 150. The true position of the 255 players is independently known, and updates regarding the positions of the 255 players are being received and interpolated to generate the motion seen in FIGS. 4B-D. According to their true positions, the 255 players are all moving in unison at the same rate and in the same direction. As shown at FIGS. 4B-D, the update rates of each of the 255 players is the same. Thus, the 255 players appear to move in unison, as each one is being updated at the same rate. A player 151 is indicated for ease of reference across the various figures. The nearest players 152, the intermediate distance players 154, and the farthest players 156 all move at the same rate and in the same direction as seen from the update locus.

With reference to FIGS. 4F-4K, a series of frames illustrating a view of 255 players moving in a circular pattern is shown, as viewed from the perspective of an update locus 150. The true position of the 255 players is independently known, and updates regarding the positions of the 255 players are being received and interpolated to generate the motion seen in FIGS. 4F-L. According to their true positions, the 255 players are all moving in unison at the same rate and in the same direction. However, the update rates of the players are determined according to the curve 112 of FIG. 2. As such, the nearest players 152 have higher update rates than the intermediate players 154, which have higher update rates than the farthest players 156. The result is that the further players appear to "lag" the players which are nearer to the update locus 150. A player 151 is indicated for ease of reference across the various figures.

Figure 4F:
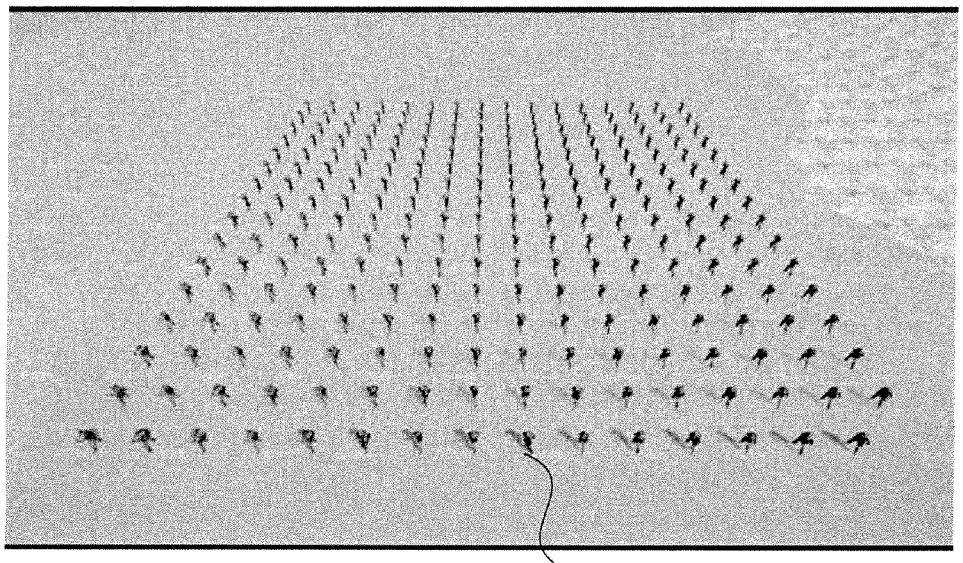
Figure 4G:
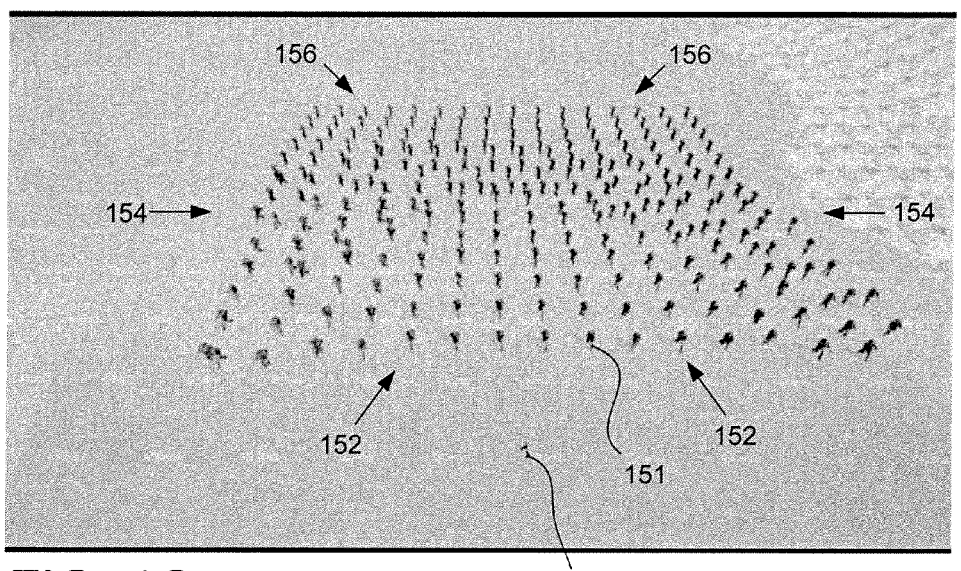
Figure 4H:
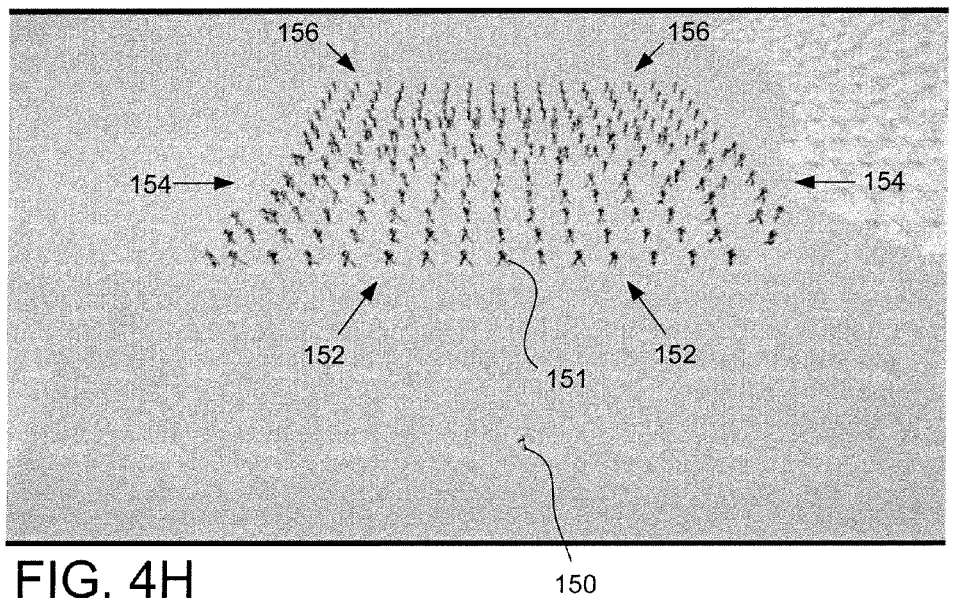
Figure 4I:
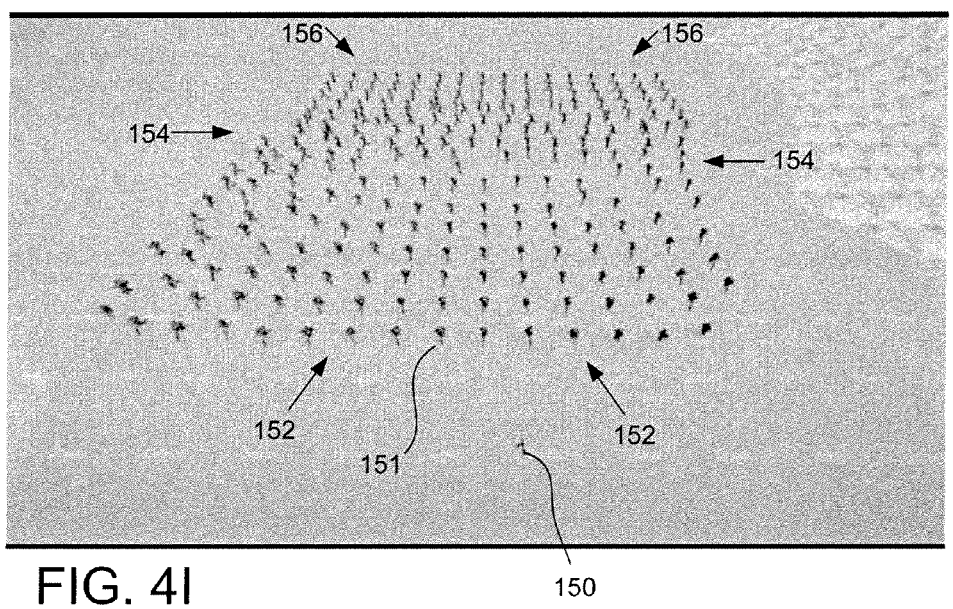
Figure 4J:
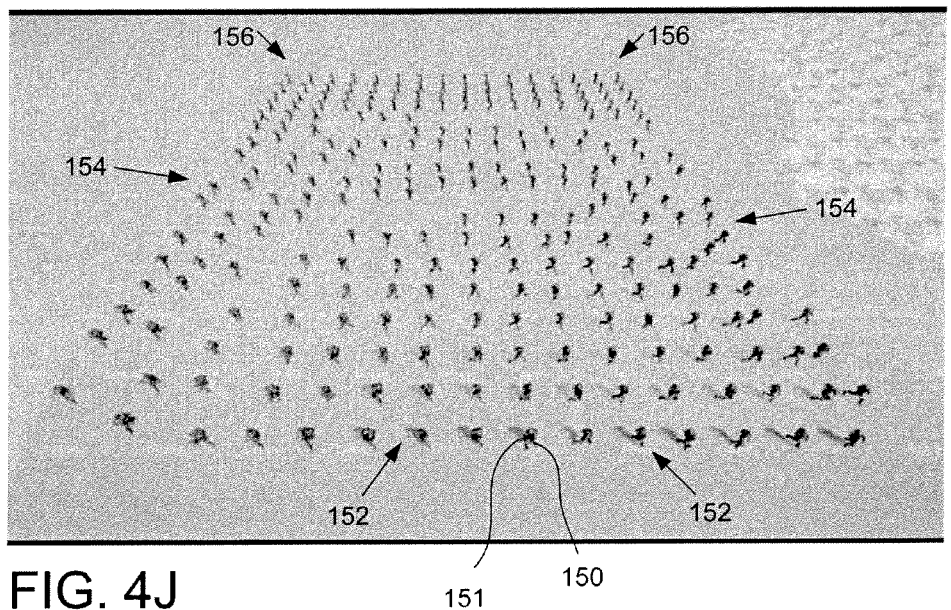
Figure 4K:
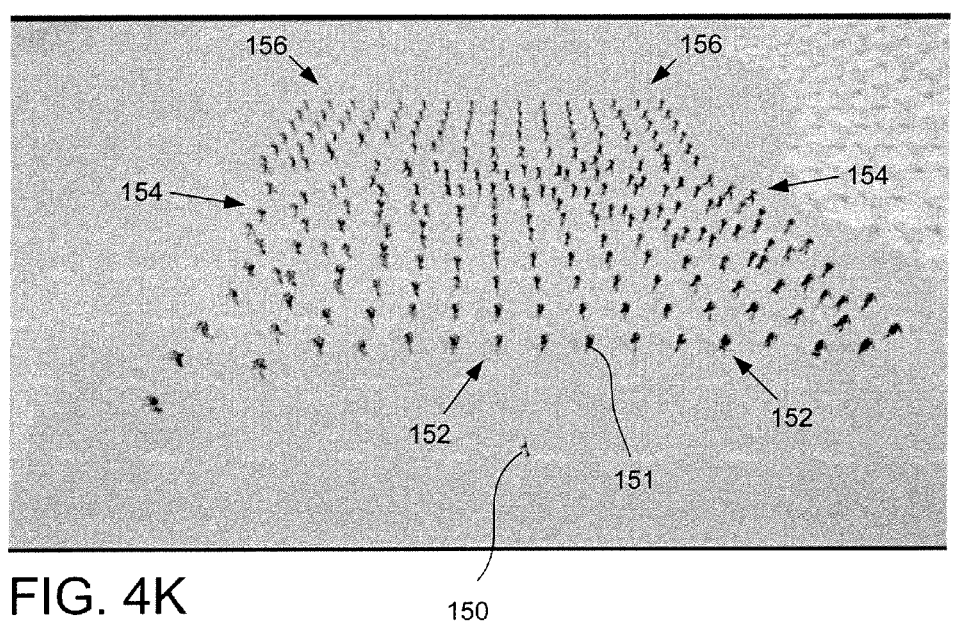

At FIG. 4F, all 255 players are shown at their starting positions. At FIG. 4G, due to the difference in update rates, the nearest players 152 have moved the most, with the intermediate players 154 lagging behind, while the farthest players 156 have yet to move from their starting positions. At FIGS. 4H and 4I, all of the players are moving, with intermediate players 154 appearing less organized than the nearest players 152 or the farthest players 156. This is partly attributable to the several different update rates which are utilized for the players, and the fact that as the players move, some players will have their update rates change depending on their relative distances from the update locus. At FIG. 4J, the nearest players 152 have returned to their original starting position, while the remaining players continue to move towards their starting positions. At FIG. 4K, the nearest players 152 have begun a second circular motion, while the intermediate players 154 and farthest players 156 continue to lag behind.

Additionally, the farther situated players 154 and 156 may exhibit less circular-type motion than the nearest players 152 due to the infrequency of updates received, and the nature of the interpolation utilized to determine the positioning and movements of these players. In some cases, depending on the update rate of a given player, the motion of the player may appear to be polygonal rather than circular, especially if the motion is being at least partially linearly interpolated. For example, if only three position updates are received for a given player during the course of the circular motion, then the player may appear to move in a triangular pattern if the player's motion is linearly interpolated.

Figure 5B:
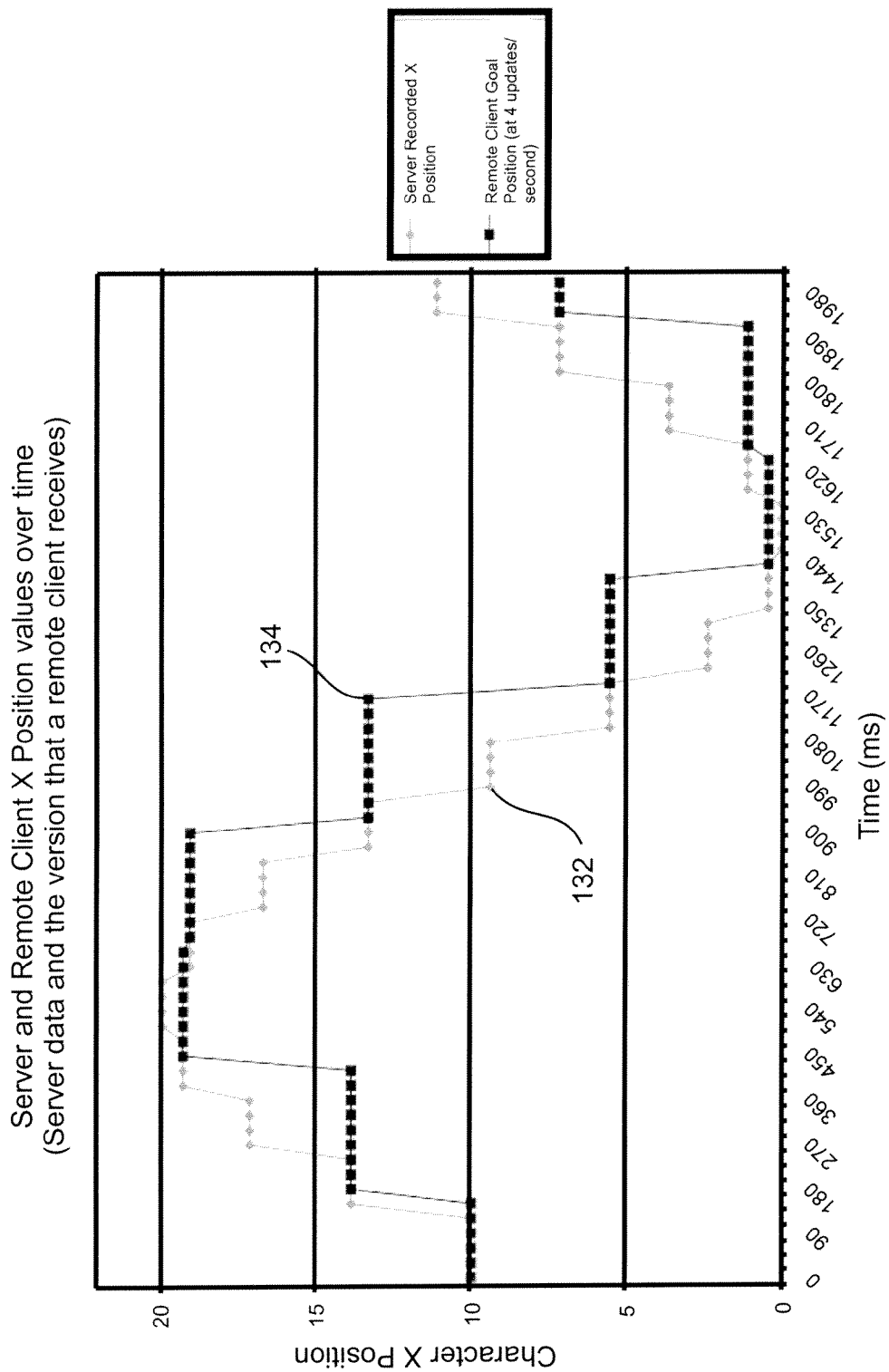

With reference to FIGS. 5A-5I, graphs illustrating linear and non-linear interpolation methods, and the effects of various update timing scenarios are shown, in accordance with embodiments of the invention. The position of a character X is simulated on a local client, the local client being authoritative for the position of character X. FIG. 5A illustrates a graph showing the position of character X versus time. Curve 130 depicts the position of character X as simulated on the local client. As shown, the position of character X on the local client moves smoothly back and forth along an arbitrary scale of zero to 20. The position of the character X on the local client is shown having a frame rate of approximately 33.33 Hz, each frame being represented by a discreet point on the curve 130. Updates regarding the position of character X are sent to a server at a rate of 8.33 updates/second (once every 120 ms). This is illustrated by the curve 132 which demonstrates the server recorded position of character X. With each update, the server-recorded position of character X "jumps" to its next position, thus yielding a discontinuous-looking step function. A remote client can receive updates from the server regarding the position of character X at a rate of 4 updates/second. The position of character X as known by the remote client is illustrated by curve 134 in FIG. 5B.

Compared to the server recorded position of character X depicted by curve 132, that of the remote client exhibits even greater "jumps" in position, as its rate of receiving updates is even lower than that of the server. Thus, if the position of character X as received by the remote client is rendered graphically, then character X would appear to jump from one static position to the next at the same rate at which updates are being received by the remote client. It is desirable to simulate smooth motion of character X on a remote client despite receiving limited updates regarding character X's position. Therefore, methods of interpolation are presented herein in accordance with embodiments of the invention.

Figure 5D:
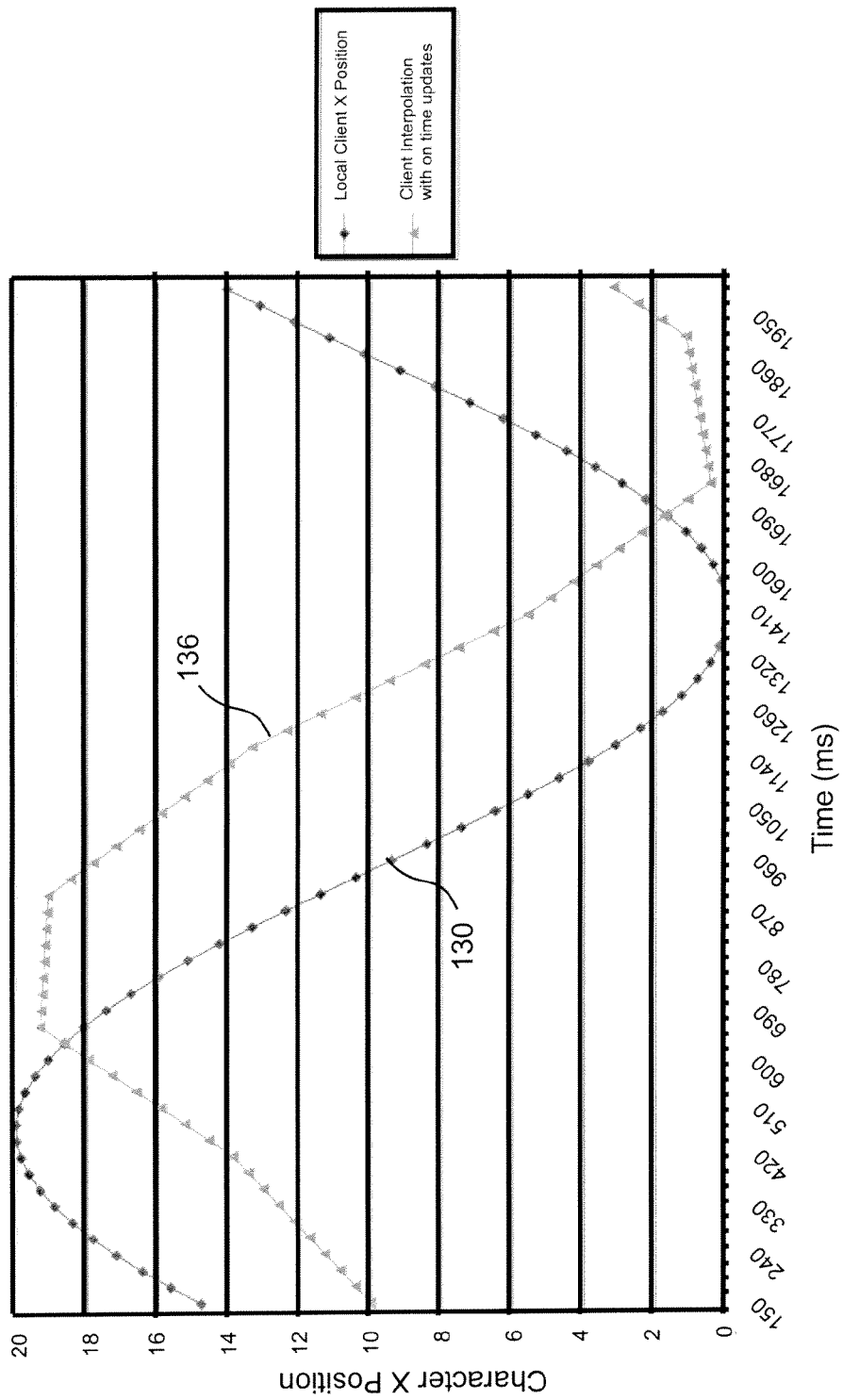

One method of interpolating is to linearly interpolate a transformation from one position to the next, as illustrated by curve 136 at FIG. 5C. In other words, when an update regarding the position of character X is received, a transformation from the current position to the updated position is linearly interpolated so as to arrive at the updated position at the time of the expected next update. In other words, the Character X movement is interpolated such that Character X moves at a constant velocity over the time period between the current time and the time of the expected next update. In the present example as shown by curve 136, interpolation is calculated for a 33.33 Hz frame rate, with updates arriving on-time at 4 updates/second. The results of such linear on-time interpolation on the remote client (curve 136) as compared to the true position of character X on the local client (curve 130) are shown in FIG. 5D. As can be seen, linear interpolation with on-time updates yields fairly satisfactory results, with smooth motion exhibited on the remote client and positioning of character X in a generally consistent manner that lags the true position as simulated on the local client.

However, due to uncertainty in the transmission of updates, updates may be received earlier or later than expected. Sources of uncertainty which can result in problems such as latency may occur at every stage of the game update process, including uncertainty and/or latency of the following: local client processing, local client-to-server transmission, server processing, server-to-remote client transmission, and remote client processing.

Figure 5E:
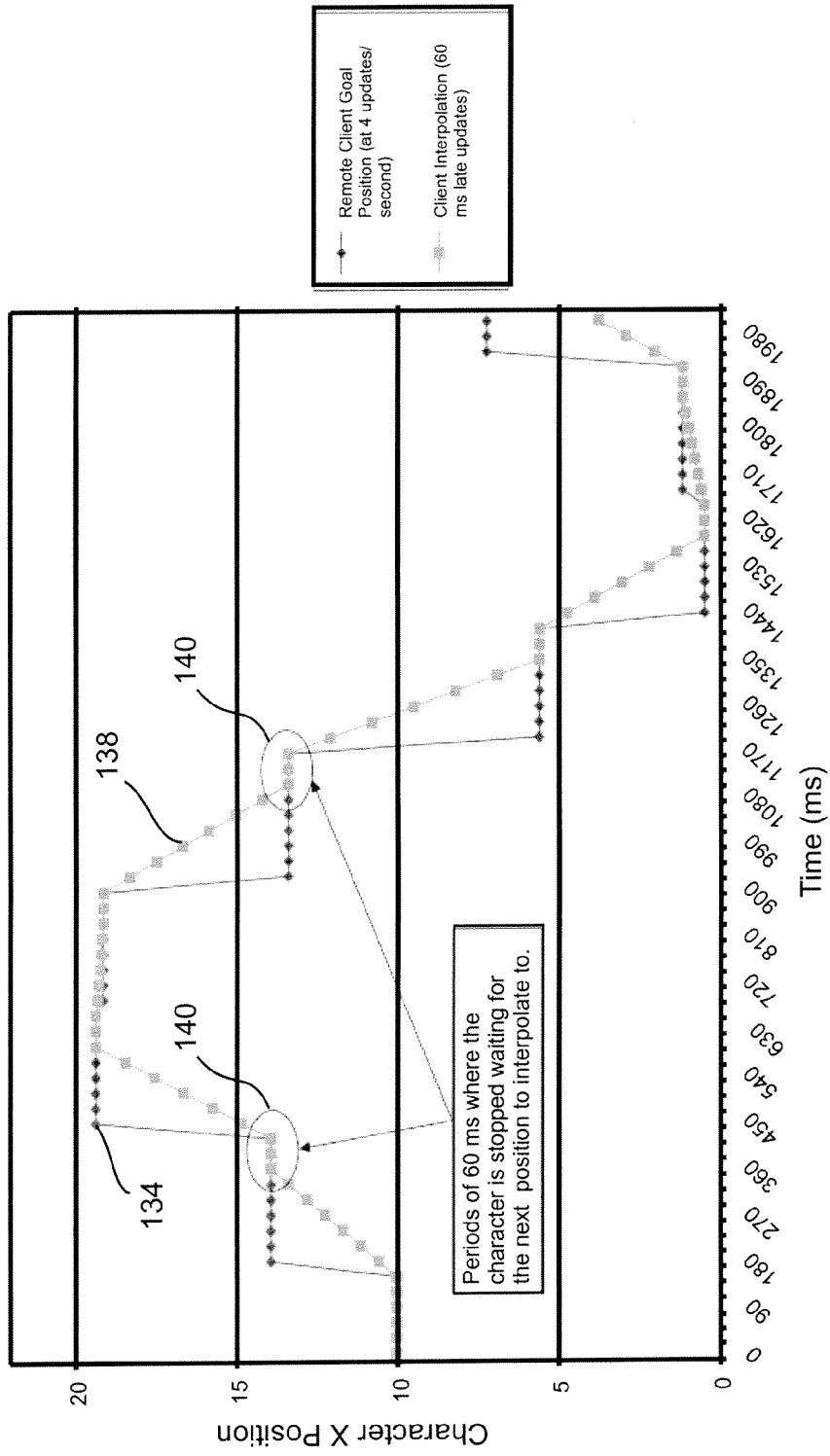

FIG. 5E illustrates the scenario where updates arrive 60 ms later than anticipated by the remote client. As demonstrated by curve 138, the position of character X is interpolated so as to arrive at the updated position at the expected time of the next update. However, because the next update arrives 60 ms later than expected, the result is that the character X as shown on the remote client will be stopped for 60 ms waiting for the next update, which looks like stop-and-go movement, as shown at areas 140 of curve 138. This is an undesirable consequence of interpolation when updates arrive later than expected.

Figure 5F:
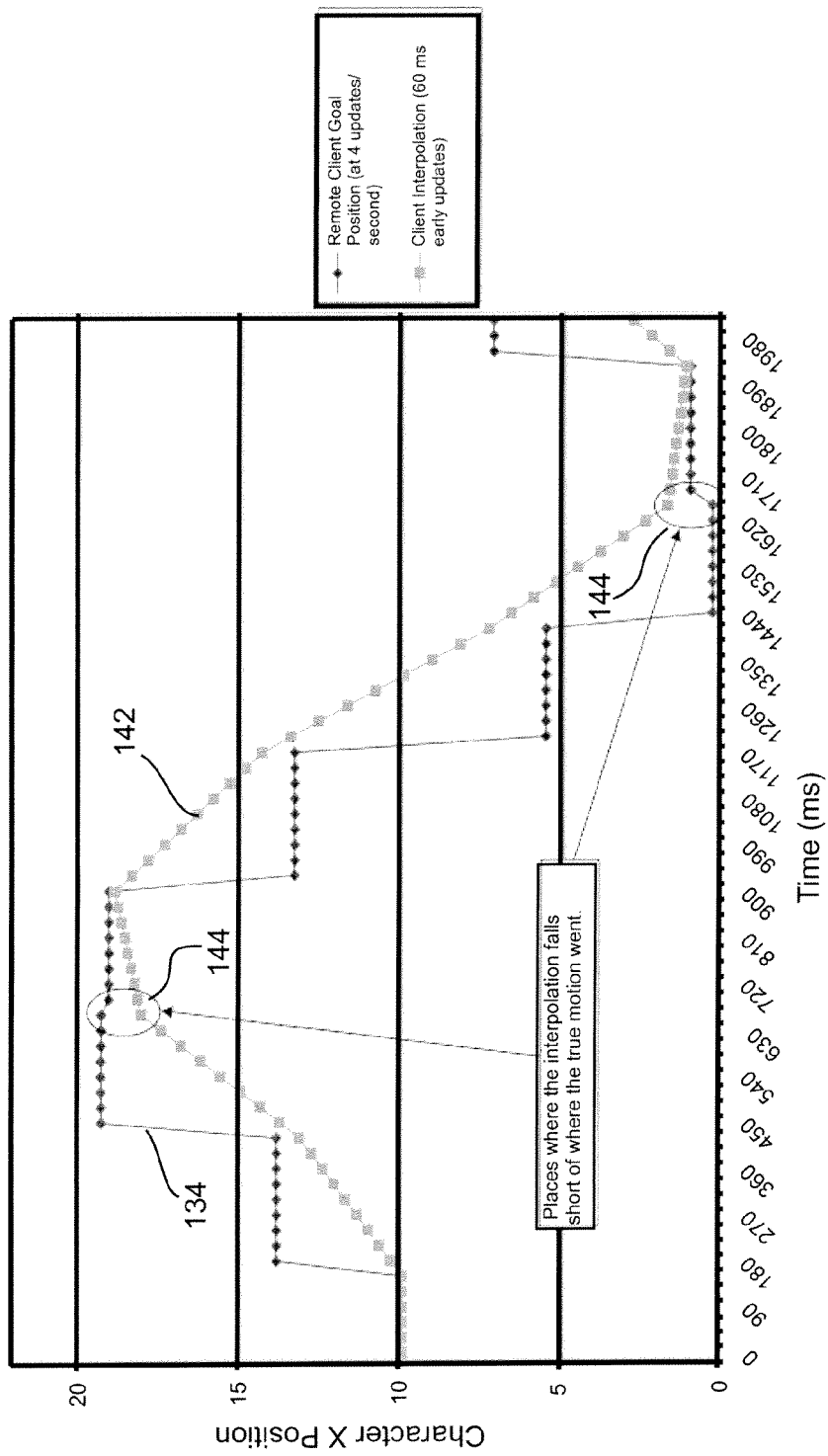

FIG. 5F illustrates the scenario where updates arrive 60 ms earlier than anticipated by the remote client. As demonstrated by curve 142, the position of character X is interpolated so as to arrive at the updated position at the expected time of the next update. However, because the next update arrives 60 ms earlier than expected, the result is that the character X as shown on the remote client is re-interpolated 60 ms before arriving at the position of the last update, so as to arrive at the new updated position at the time of the next expected update. The motion as interpolated and seen by the remote client will be smooth. However, it is also less accurate to the true locations, as demonstrated by areas 144 of curve 142, where the interpolation falls short of where the true motion went.

Figure 5G:
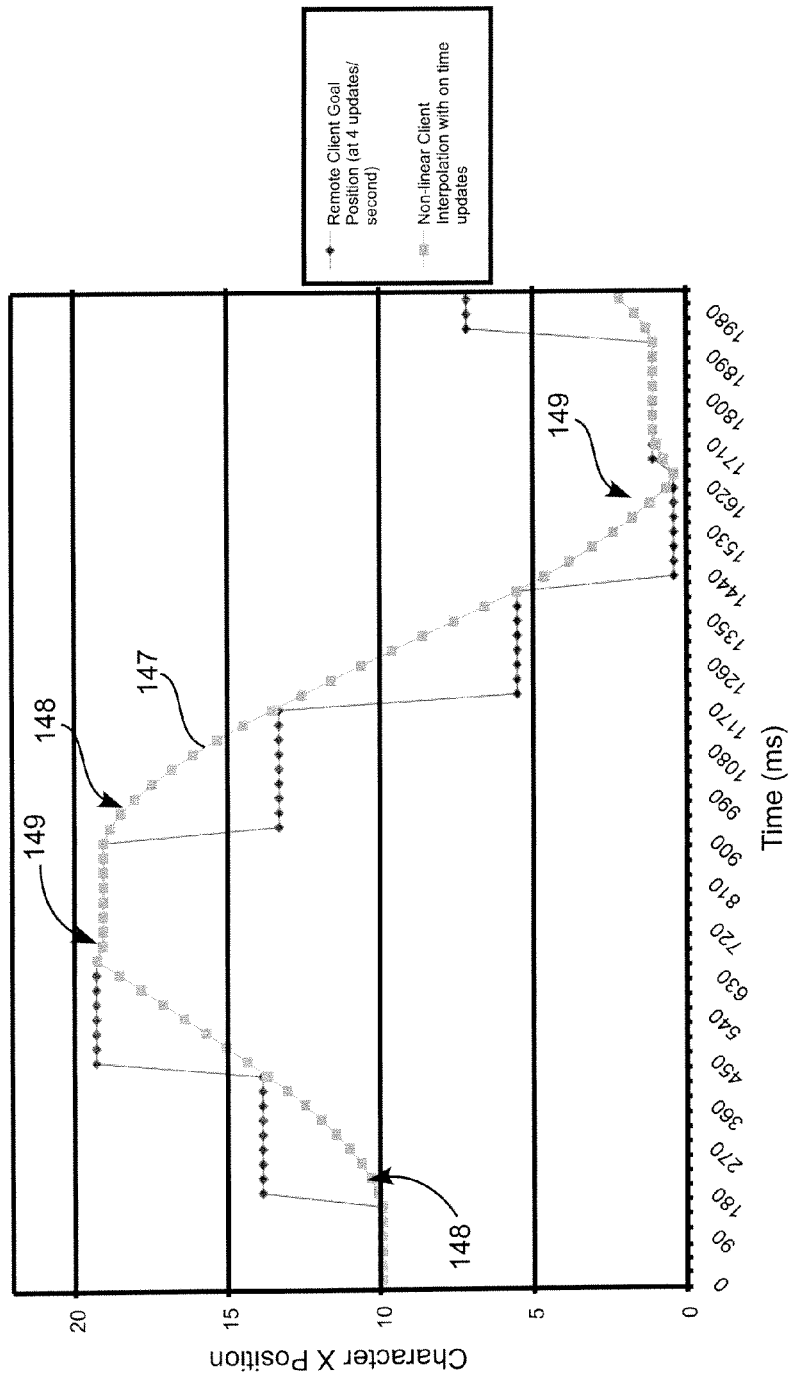
Figure 5H:
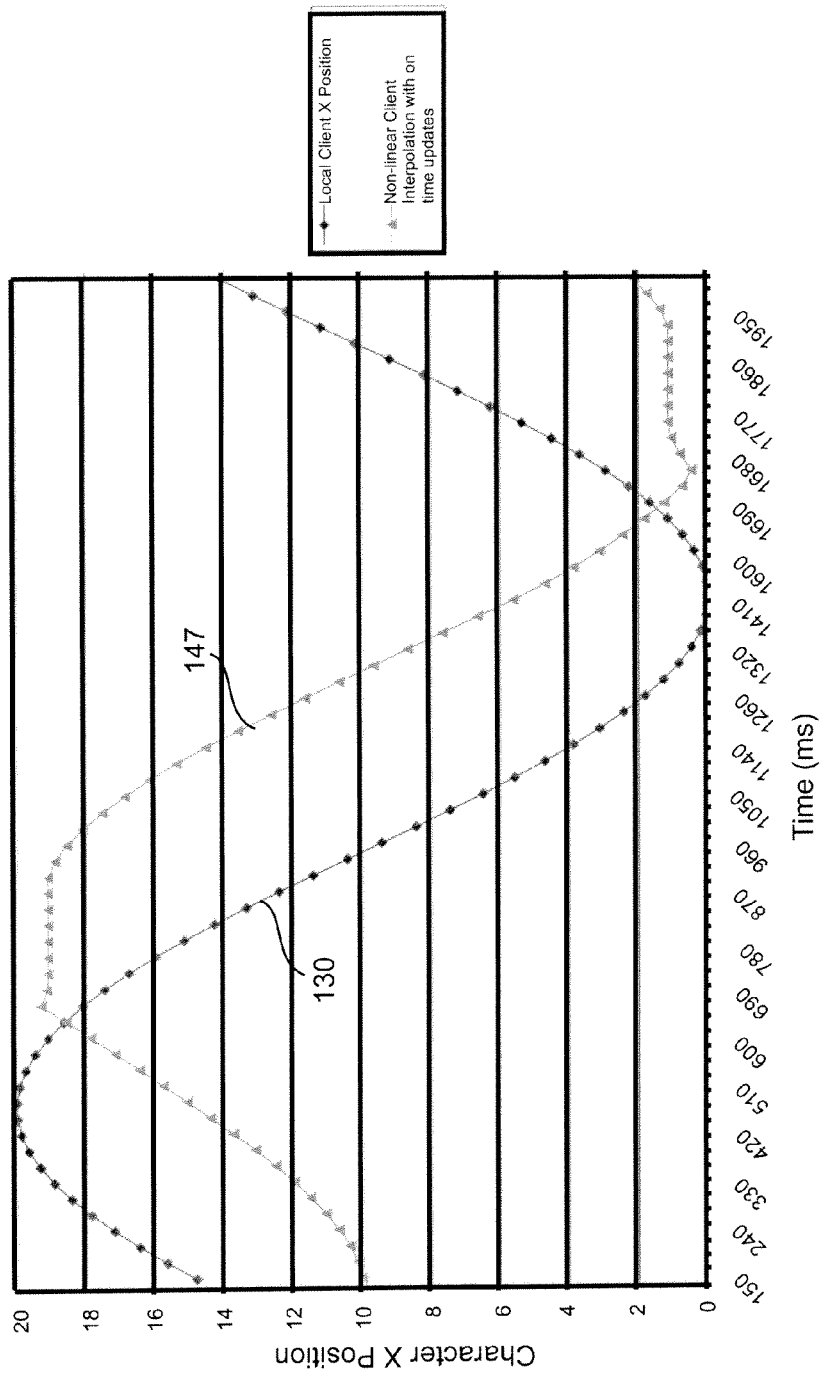

FIG. 5G illustrates the results of applying a non-linear interpolation method at curve 147, in accordance with an embodiment of the invention. The Character X position at each frame of curve 147 is generally determined by calculating the linearly interpolated velocity (which is a vector quantity) required to reach the goal position (updated position) and averaging in 70% of the previous frame's existing speed (i.e. the magnitude of the velocity of the previous frame—a scalar quantity). In other words, the directional component of the velocity at a given frame is based upon the linearly interpolated vector, whereas the speed (magnitude) component of the velocity is determined by combining 30% of the linearly interpolated speed with 70% of the previous frame's speed. The result is that abrupt changes in speed are reduced as demonstrated at regions 148, where the change in speed is gradual rather than abrupt as in the case of the linearly interpolated curve 136. In various embodiments of the invention, the particular percentage of the previous frame's speed which is averaged into the linearly interpolated velocity required to reach the goal position may vary. In some embodiments, the percentage is less than 70%; whereas in other embodiments, the percentage is greater than 70%. As the relative percentage of the previous frame's speed being averaged into the current frame's velocity decreases, so the interpolation will more closely resemble a linearly interpolated result. Whereas increasing the percentage produces results wherein the speed from one frame to the next differs to a lesser extent.

However, when the position of the next update is a short distance from the current position, but the current speed of the Character X is relatively high, the result of applying the presently described interpolation method may cause the Character X to "overshoot" the target update position. Therefore, in an embodiment of the invention, an interpolation method includes methods for ensuring that the Character X does not overshoot the target updated position, as demonstrated at regions 149. For example, the interpolation method may determine whether the target updated position is nearer to the current position than the interpolated position at the next frame, and if so, then setting the position at the next frame to be the target updated position.

Figure 5I:
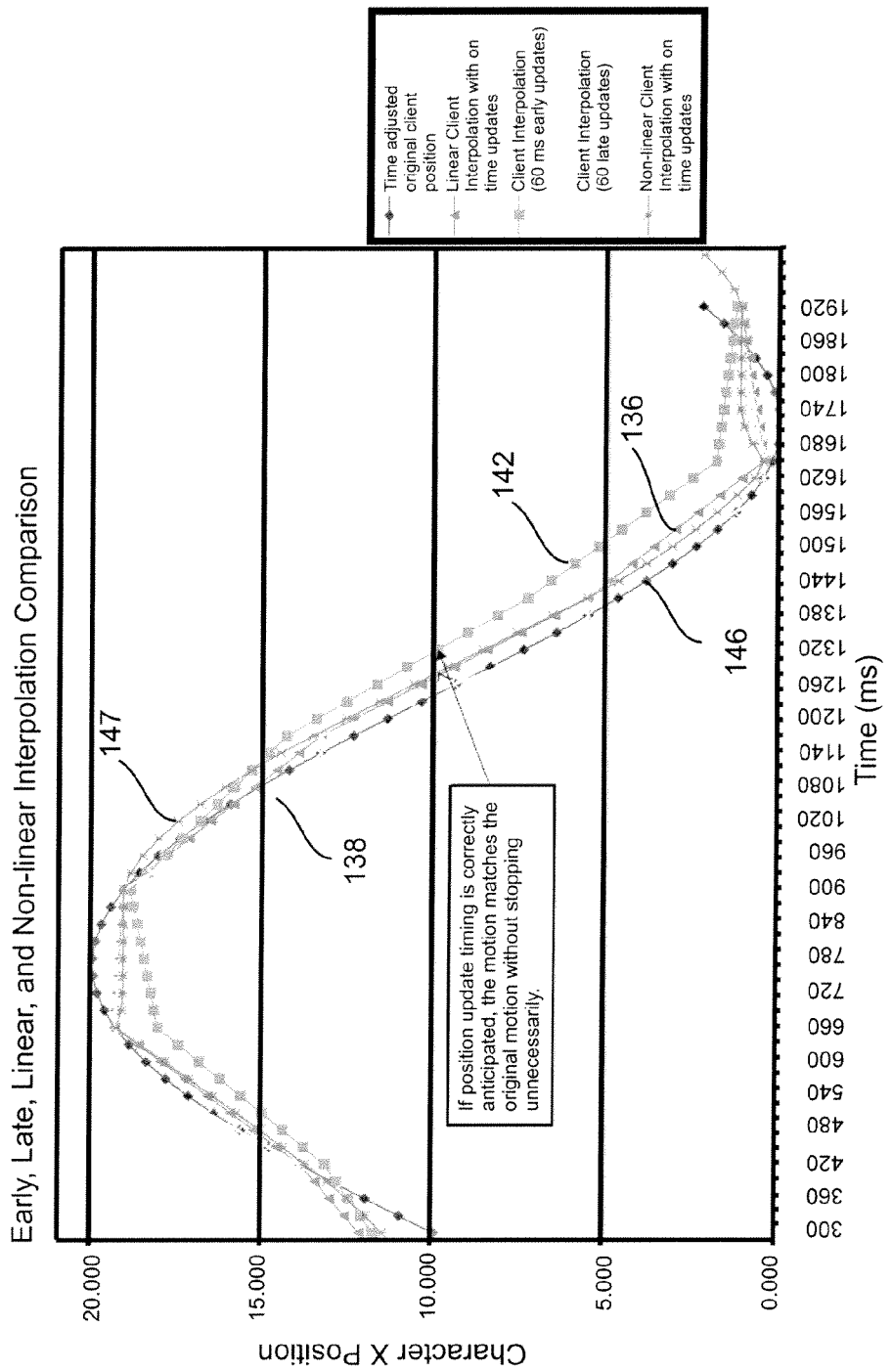

FIG. 5I illustrates curves 136 (linear client interpolation with on-time updates), 138 (linear client interpolation with updates 60 ms late), 142 (linear client interpolation with updates 60 ms early), and 147 (non-linear client interpolation with on-time updates). A curve 146 shows a time-adjusted original client position for comparison, it being understood that the interpolated curves will generally lag the original client position as simulated on the local client by a predictable amount based upon the update rate of the server and the update rate of the remote client and the time that it takes the data to travel across the network.

One strategy for dealing with issues of network uncertainty, such as network latency, is to target the interpolation so as to arrive at the updated position at some time interval after the expected time of the next update. Thus, in the case where an update arrives on time, then the situation is similar to that described above regarding updates arriving earlier than expected. Some accuracy of position is lost depending on the size of the time interval, but motion remains smooth. Whereas, in the case where an update arrives later than expected, then the problem of stop-and-go motion, as discussed above with regard to updates arriving later than expected, is mitigated or avoided. The problem is avoided if the lateness of the update is less than the time interval. In accordance with one embodiment, the time interval is approximately 30 ms. In other embodiments, the time interval may be less than 30 ms or more than 30 ms. In various embodiments, the presently described method of targeting interpolation to cause an object to arrive at the updated position at some time interval after the expected time of the next update may be applied to both linear as well as non-linear interpolation methods, as discussed above.

Figure 6:
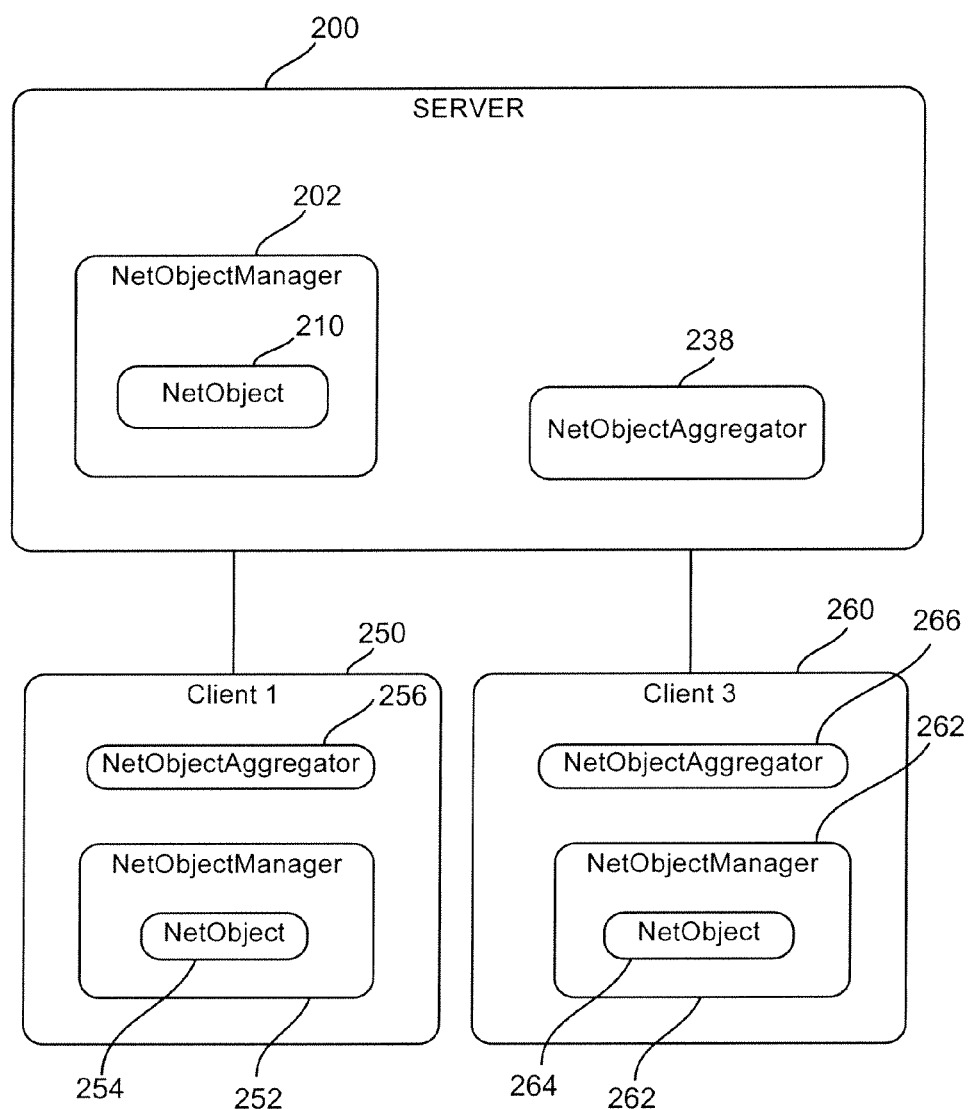
FIG. 6 illustrates a simulation system, in accordance with an embodiment of the invention.

FIG. 6 illustrates a simulation system in which the presently described methods may be implemented, in accordance with an embodiment of the invention. Server 200 includes a NetObjectManager 202, which is an object manager for managing a NetObject 210, which is an object of a simulation running on the server 200. The NetObject 210 is one example of a plurality of objects within a spatial field of the simulation. NetObjectAggregator 238 aggregates data that is to be sent out, including updates regarding NetObject 210. A first client 250 is connected to server 200 via a network such as the internet. The client 250 runs an instance of the simulation corresponding to that of the server 200, which therefore includes a corresponding plurality of objects to that of the server. A NetObjectManager 252 is an object manager for managing a NetObject 254, which is an object of the simulation corresponding to NetObject 210 on the server 200. A NetObjectAggregator 256 aggregates data that is to be sent to the server 200. Likewise, a second client 260 is connected to server 200 via a network such as the internet. The client 260 also runs an instance of the simulation corresponding to that of the server 200, which therefore includes a plurality of objects corresponding to that of the server. A NetObjectManager 262 is an object manager for managing a NetObject 264, which is an object of the simulation corresponding to NetObject 210 on the server 200. A NetObjectAggregator 266 aggregates data that is to be sent to the server 200.

By way of example only and for purposes of illustrating operation of the system according to methods in accordance with an embodiment of the invention, the operation of the server-client system of FIG. 6 is herein described. As discussed, the NetObjects 210, 254, and 264 correspond to each other, and are each a part of their respective entity's (server or client) simulation. Assume that NetObject 254 is a character which represents a first player at client 250. The client 250 is therefore authoritative for the properties of that character, which is controlled by the first player. Thus, only the client 250 maintains the "true" position of the character as embodied by the NetObject 254. The NetObjectAggregator 256 sends updates to the server 200, which include update data regarding NetObject 254. The server 200's NetObject 210 is updated based on this received update data from the client 250.

The client 260 communicates an update locus to the server 200. The update locus of client 260 may be one of the plurality of objects of the simulation (such as a character which a player at the client) or some other specified location within the spatial field of the simulation. Based on the update locus of the client 260, update rates for the plurality of objects at the server 200 are determined. Then, the NetObjectAggregator 238 assembles updates of the objects according to their determined update rates and sends them to the client 260. The client 260 receives the updates and updates its corresponding plurality of objects accordingly.

In one embodiment, the update rates are determined in accordance with previously described methods. As such, the update rates for the plurality of objects at the server 200 are determined by first sorting the plurality of objects based on their distance from the update locus of the client 260. Then, update rates are determined for the plurality of objects based on the sorted order, such that update rate of an object decreases as distance from the update locus of the client 260 increases.

Obviously, the present embodiment has been described with reference to the NetObject 254 of client 250 as the update locus. However, in other embodiments of the invention, an object for which server 200 of the client 260 is authoritative may serve as the update locus. In further embodiments of the invention, any number of clients may be included in the system.

Figure 7:
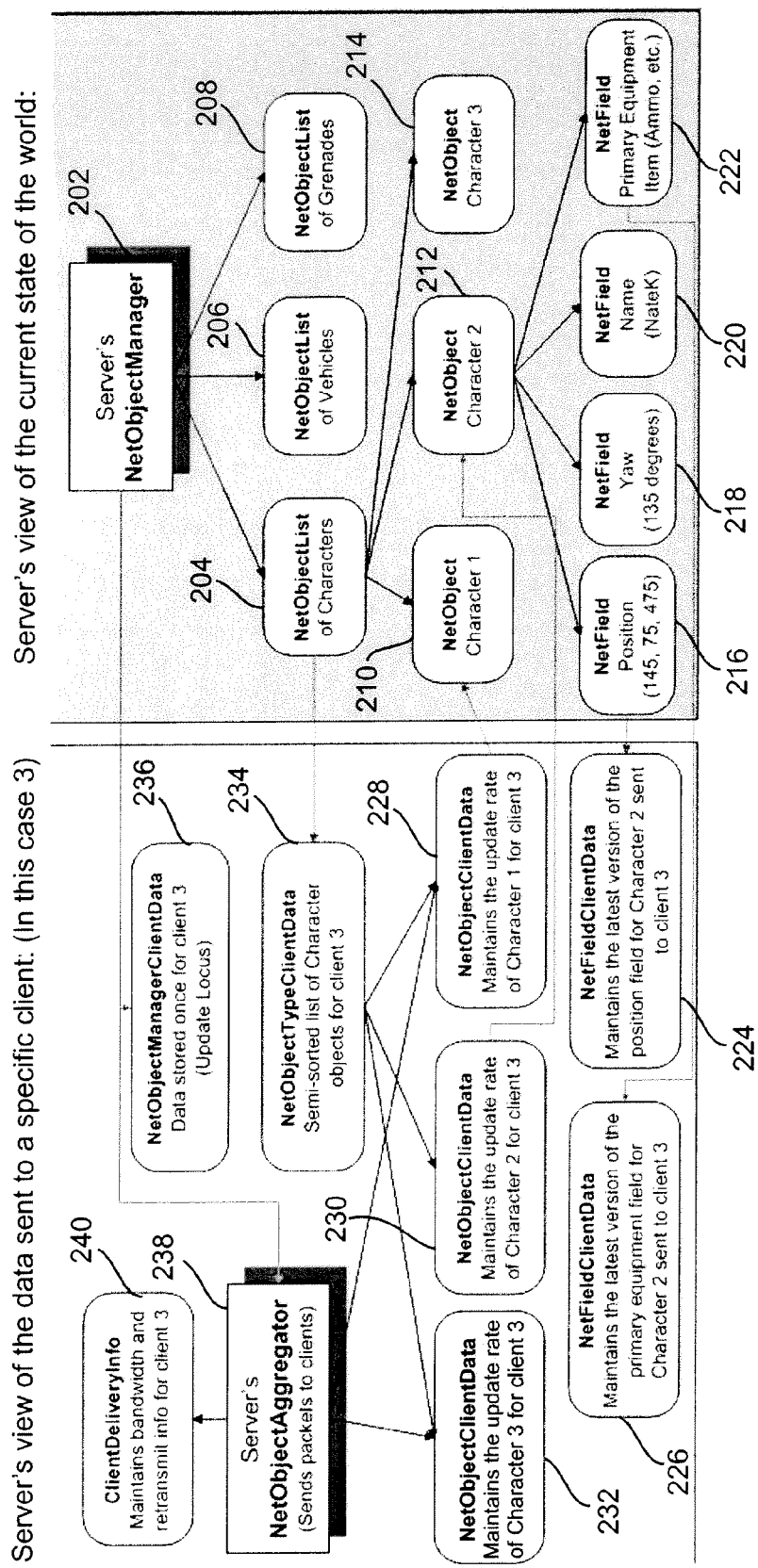
FIG. 7 illustrates a detailed view of the objects of a simulation run on a server, in accordance with an embodiment of the invention.

FIG. 7 illustrates a more detailed view of the objects of the simulation run on server 200. The NetObjectManager 202 references a number of NetObjectLists 204, 206, and 208. Each NetObjectList corresponds to a type of object in the simulation, and provides a list of those objects of that type. By way of example, NetObjectList 204 is the list of characters, whereas NetObjectsList 206 is the list of vehicles, and NetObjectList 208 is the list of grenades in the simulation. Each NetObjectList references a number of NetObjects. By way of example, NetObjectList 204 references NetObjects 210, 212, and 214, which correspond to a Character 1, Character 2 and Character 3, respectively. Each NetObject references one or more NetFields, which contain data relating to a property of the NetObject. By way of example, the NetObject 212 references NetField 216 for position, NetField 218 for Yaw, NetField 220 for the name of the character, and NetField 222 for the primary equipment item of the character.

NetFields additionally reference NetFieldClientData objects, which maintain the latest version of the corresponding NetField data sent to a particular client. Thus, by way of example, NetField 216 references NetFieldClientData 224, which maintains the latest version of the position field for Character 2 (NetObject 212) which was sent to a client 3. NetField 222 references NetFieldClientData 226, which maintains the latest version of the primary equipment field for Character 2 which was sent to client 3. A NetObjectAggregator 238 is provided, which is an object aggregator that gathers data such as update data and packetizes the data for delivery to clients. The NetObjectAggregator 238 references a ClientDeliveryInfo object, which maintains the bandwidth and retransmit info for a client 3. The NetObjectAggregator 238 references NetObjectClientData objects 228, 230, and 232, which maintain the update rate of Characters 1, 2 and 3, respectively. Each NetObjectClientData object references the appropriate NetObject to receive the latest NetField data. A NetObjectTypeClientData object 234 references the NetObjectClientData objects, and is referenced by the NetObjectList 204, and maintains a semi-sorted list of Character objects for the client 3. The NetObjectManagerClientData object 236 maintains data stored once for the client 3, including the update locus.

With continued reference to FIG. 7, the present example illustrates how updates are to be sent to client 3 regarding Characters 1, 2, and 3. The NetObjectManagerClientData object 236 is referenced to determine client 3's update locus. Utilizing client 3's update locus, update rates are determined for various objects according to distance from client 3's update locus. The update rates may be determined in accordance with the previously described methods, wherein update rate decreases as distance from client 3's update locus increases. These update rates are stored at the NetObjectClientData objects 228, 230, and 232. The server's NetObjectAggregator 238 references the NetObjectClientData objects 228, 230, and 232 to determine the update rates for Characters 1, 2, and 3, respectively. Accordingly, the NetObjectAggregator 238 assembles update data regarding Characters 1, 2 and 3 in accordance with the update rates for those Characters, and sends the data as packets to client 3. In other words, a given series of packets may or may not contain data for any of the Characters 1, 2, and 3, as update data is only sent when it is determined to be appropriate based on the Character's update rate for client 3, and whether or not there is new information to send about that Character.

The embodiments presently described with reference to FIGS. 6 and 7 comprise multiple software modules that are collaboratively organized as part of a system. The system embodiments herein described are useful for operating a game or simulation having a plurality of objects, and determining update rates for each of the plurality of objects, and sending updates regarding the plurality of objects in accordance with the determined update rates. The modules of the present embodiments are capable of execution by various computing systems, and may be embodied as a product contained in a computer-readable medium.

Additionally, the presently described methods and systems are useful as applied to massively multiplayer online (MMO) games. As understood by those skilled in the art, an MMO game is a video game which is capable of simultaneously supporting hundreds or thousands of players. MMO games include a variety of gameplay types, such as role-playing games, first-person shooter games, real-time strategy games, sports games, social games, and real-world simulations. Typically, MMO games are played on the Internet, which facilitates the large-scale networked communications required by MMO games. MMO games may be played not only on personal computers, but also on game consoles that can access the Internet, such as the PlayStation® Portable and PlayStation® 3. MMO games enable players to cooperate, compete, and interact with each other on a large scale. MMO games typically create a persistent universe where the game continues playing regardless of whether or not any given player is playing.

Figure 8:
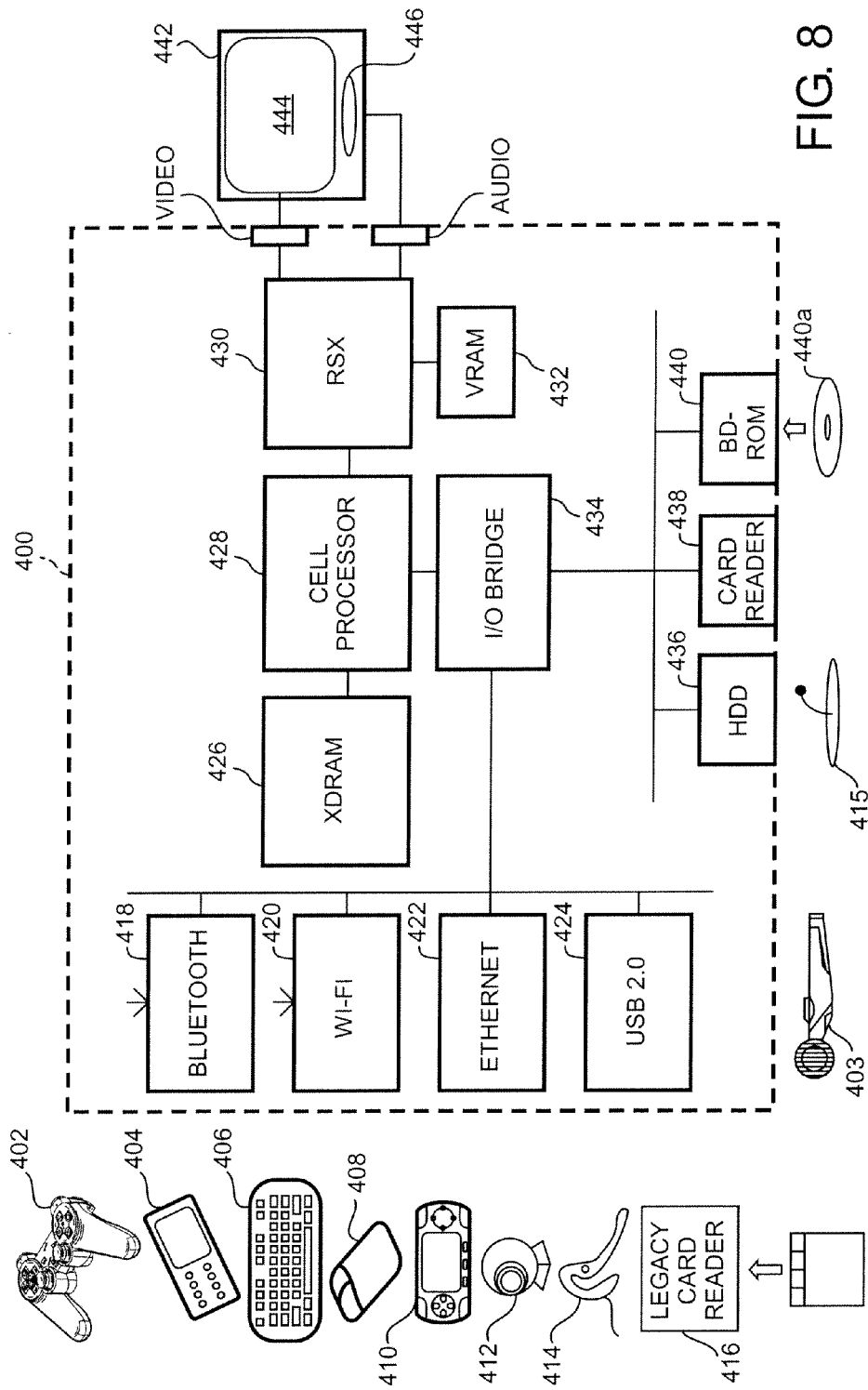
FIG. 8 illustrates the overall system architecture of the Sony® Playstation 3® entertainment device.

FIG. 8 schematically illustrates the overall system architecture of the Sony® Playstation 3® entertainment device, a console that may be compatible for implementing a three-dimensional controller locating system in accordance with one embodiment of the present invention. A system unit 400 is provided, with various peripheral devices connectable to the system unit 400. The system unit 400 comprises: a Cell processor 428; a Rambus® dynamic random access memory (XDRAM) unit 426; a Reality Synthesizer graphics unit 430 with a dedicated video random access memory (VRAM) unit 432; and an I/O bridge 434. The system unit 400 also comprises a Blu Ray® Disk BD-ROM® optical disk reader 440 for reading from a disk 440a and a removable slot-in hard disk drive (HDD) 436, accessible through the I/O bridge 434. Optionally the system unit 400 also comprises a memory card reader 438 for reading compact flash memory cards, Memory Stick® memory cards and the like, which is similarly accessible through the I/O bridge 434.

The I/O bridge 434 also connects to six Universal Serial Bus (USB) 2.0 ports 424; a gigabit Ethernet port 422; an IEEE 802.11b/g wireless network (Wi-Fi) port 420; and a Bluetooth® wireless link port 418 capable of supporting of up to seven Bluetooth connections.

In operation, the I/O bridge 434 handles all wireless, USB and Ethernet data, including data from one or more game controllers 402-403. For example when a user is playing a game, the I/O bridge 434 receives data from the game controller 402-403 via a Bluetooth link and directs it to the Cell processor 428, which updates the current state of the game accordingly.

The wireless, USB and Ethernet ports also provide connectivity for other peripheral devices in addition to game controllers 402-403, such as: a remote control 404; a keyboard 406; a mouse 408; a portable entertainment device 410 such as a Sony Playstation Portable® entertainment device; a video camera such as an EyeToy® video camera 412; a microphone headset 414; and a microphone 415. Such peripheral devices may therefore in principle be connected to the system unit 400 wirelessly; for example the portable entertainment device 410 may communicate via a Wi-Fi ad-hoc connection, whilst the microphone headset 414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 416 may be connected to the system unit via a USB port 424, enabling the reading of memory cards 448 of the kind used by the Playstation® or Playstation 2® devices.

The game controllers 402-403 are operable to communicate wirelessly with the system unit 400 via the Bluetooth link, or to be connected to a USB port, thereby also providing power by which to charge the battery of the game controllers 402-403. Game controllers 402-403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 402 is a controller designed to be used with two hands, and game controller 403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 404 is also operable to communicate wirelessly with the system unit 400 via a Bluetooth link. The remote control 404 comprises controls suitable for the operation of the Blu Ray™ Disk BD-ROM reader 440 and for the navigation of disk content.

The Blu Ray™ Disk BD-ROM reader 440 is operable to read CD-ROMs compatible with the Playstation and PlayStation 2 devices, in addition to conventional pre-recorded and recordable CDs, and so-called Super Audio CDs. The reader 440 is also operable to read DVD-ROMs compatible with the Playstation 2 and PlayStation 3 devices, in addition to conventional pre-recorded and recordable DVDs. The reader 440 is further operable to read BD-ROMs compatible with the Playstation 3 device, as well as conventional pre-recorded and recordable Blu-Ray Disks.

The system unit 400 is operable to supply audio and video, either generated or decoded by the Playstation 3 device via the Reality Synthesizer graphics unit 430, through audio and video connectors to a display and sound output device 442 such as a monitor or television set having a display 444 and one or more loudspeakers 446. The audio connectors 450 may include conventional analogue and digital outputs whilst the video connectors 452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 400. The camera LED indicator is arranged to illuminate in response to appropriate control data from the system unit 400, for example to signify adverse lighting conditions. Embodiments of the video camera 412 may variously connect to the system unit 400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 400, an appropriate piece of software such as a device driver should be provided. Device driver technology is well-known and will not be described in detail here, except to say that the skilled man will be aware that a device driver or similar software interface may be required in the present embodiment described.

Figure 9:
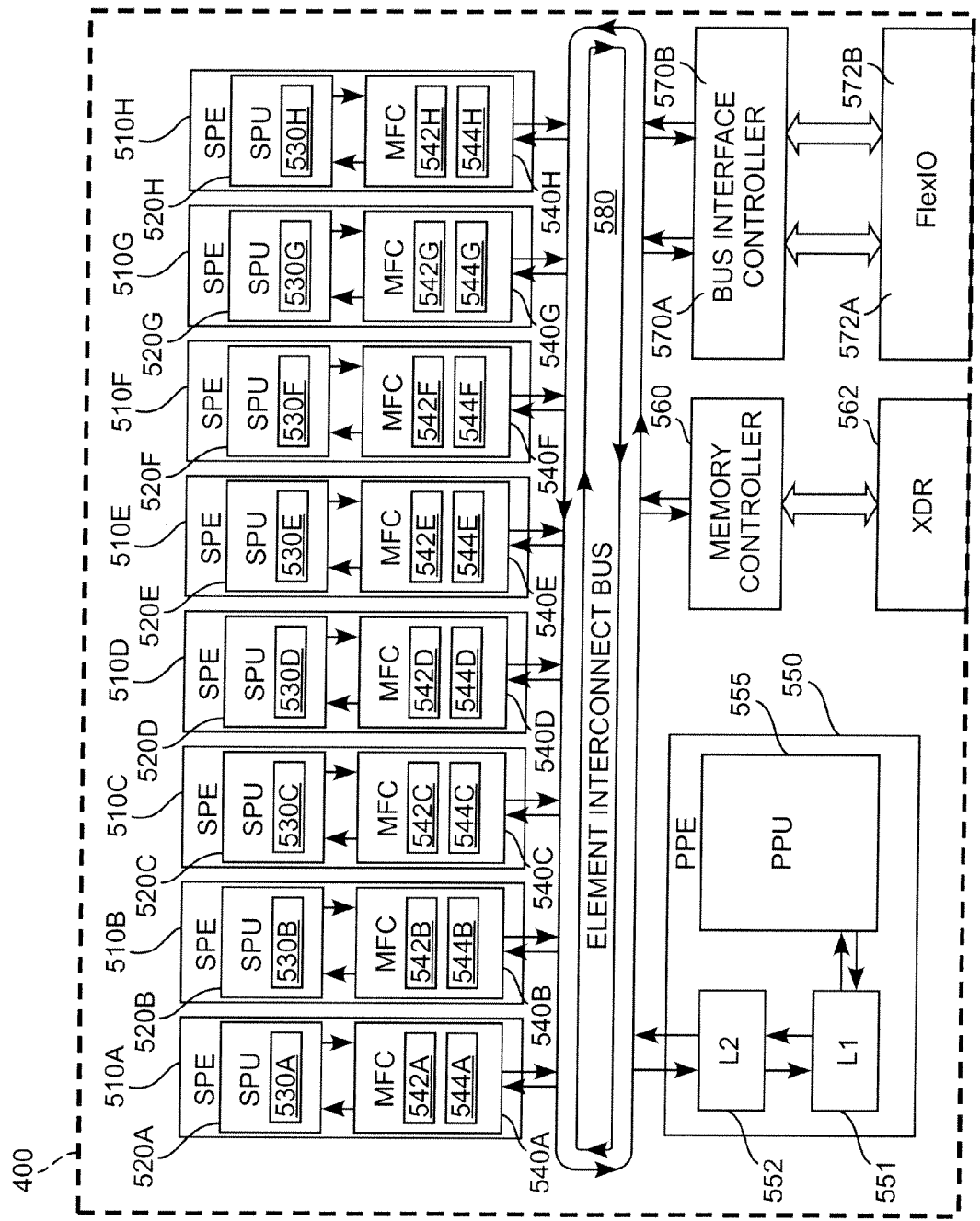
FIG. 9 illustrates hardware that may be used to process instructions, in accordance with an embodiment of the invention.

FIG. 9 illustrates additional hardware that may be used to process instructions, in accordance with one embodiment of the present invention. Cell processor 428 has an architecture comprising four basic components: external input and output structures comprising a memory controller 560 and a dual bus interface controller 570A, B; a main processor referred to as the Power Processing Element 550; eight co-processors referred to as Synergistic Processing Elements (SPEs) 510A-H; and a circular data bus connecting the above components referred to as the Element Interconnect Bus 580. The total floating point performance of the Cell processor is 218 GFLOPS, compared with the 6.2 GFLOPs of the Playstation 2 device's Emotion Engine.

The Power Processing Element (PPE) 550 is based upon a two-way simultaneous multithreading Power 470 compliant PowerPC core (PPU) 555 running with an internal clock of 3.2 GHz. It comprises a 512 kB level 2 (L2) cache and a 32 kB level 1 (L1) cache. The PPE 550 is capable of eight single position operations per clock cycle, translating to 25.6 GFLOPs at 3.2 GHz. The primary role of the PPE 550 is to act as a controller for the Synergistic Processing Elements 510A-H, which handle most of the computational workload. In operation the PPE 550 maintains a job queue, scheduling jobs for the Synergistic Processing Elements 510A-H and monitoring their progress. Consequently each Synergistic Processing Element 510A-H runs a kernel whose role is to fetch a job, execute it and synchronized with the PPE 550.

Each Synergistic Processing Element (SPE) 510A-H comprises a respective Synergistic Processing Unit (SPU) 520A-H, and a respective Memory Flow Controller (MFC) 540A-H comprising in turn a respective Dynamic Memory Access Controller (DMAC) 542A-H, a respective Memory Management Unit (MMU) 544A-H and a bus interface (not shown). Each SPU 520A-H is a RISC processor clocked at 3.2 GHz and comprising 256 kB local RAM 530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 520A-H does not directly access the system memory XDRAM 426; the 64-bit addresses formed by the SPU 520A-H are passed to the MFC 540A-H which instructs its DMA controller 542A-H to access memory via the Element Interconnect Bus 580 and the memory controller 560.

The Element Interconnect Bus (EIB) 580 is a logically circular communication bus internal to the Cell processor 428 which connects the above processor elements, namely the PPE 550, the memory controller 560, the dual bus interface 570A,B and the 8 SPEs 510A-H, totaling 12 participants. Participants can simultaneously read and write to the bus at a rate of 8 bytes per clock cycle. As noted previously, each SPE 510A-H comprises a DMAC 542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 560 comprises an XDRAM interface 562, developed by Rambus Incorporated. The memory controller interfaces with the Rambus XDRAM 426 with a theoretical peak bandwidth of 25.6 GB/s.

The dual bus interface 570A,B comprises a Rambus FlexIO® system interface 572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 434 via controller 570A and the Reality Simulator graphics unit 430 via controller 570B.

Data sent by the Cell processor 428 to the Reality Simulator graphics unit 430 will typically comprise display lists, being a sequence of commands to draw vertices, apply textures to polygons, specify lighting conditions, and so on.

The invention may be practiced with other computer system configurations including computing devices, handheld devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

While this invention has been described in terms of several preferred embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. In a server-implemented video game that is executed by a server computer, a method for providing updates to a remote client device regarding a plurality of objects located in a virtual space of the video game, wherein the plurality of objects includes two or more classes of objects, said method comprising:
   receiving, over a network by the server computer, an update locus from the remote client device, the update locus indicating a client-specified position, that is determined by the remote client device, within the virtual space of the server-implemented video game;
   determining, by the server-implemented video game, respective distances of each of the plurality of objects from the update locus in the virtual space;
   determining an update rate profile for each class of objects, the update rate profile indicating the update rate of a given object based on the given object's ranked order within the class as determined by its distance from the update locus;
   for each class of objects, sorting the objects of the class according to their determined distances from the update locus;
   determining, by the server-implemented video game, an update rate for each of the plurality of objects based upon its class and update rate profile, the update rate for a given one of the plurality of objects defining a frequency with which updates regarding the given one of the plurality of objects are sent from the server computer to the remote client device that provided the update locus;
   sending updates over the network regarding each of the plurality of objects, from the server computer to the remote client device, according to the determined update rates, so that updates are sent from the server computer to the remote client device using at least two different update rates for each of at least two of the plurality of objects, respectively, during an update, the determined update rates being applied to the plurality of objects to provide a representation on a display in communication with the remote client device.

2. The method of claim 1, wherein the determining an update rate further includes:
   dividing the objects in a given one of the classes of objects into consecutive non-overlapping cohorts;
   determining, for each cohort, a single update rate to apply to each object in the cohort, such that the update rate decreases as distance of the cohort from the update locus increases.

3. The method of claim 1, wherein the client-specified position is the position of a first-person character or a third-person character of a player of the video game.

4. The method of claim 1, wherein the client-specified position is the position of a point of interest of a player of the video game.

5. The method of claim 1, wherein the operation of sending updates further includes sending an update for a given object according to its determined update rate only when the given object exhibits a changed status from the status of its previously sent update.

6. The method of claim 1, wherein the update rate of each of the plurality of objects ranges between zero and a predefined maximum update rate.

7. The method of claim 1, wherein the remote client receives the updates without communicating with an additional remote client that controls a position of one or more of the plurality of objects within the virtual spatial field.

8. The method of claim 1, wherein the updates regarding the plurality of objects define positions of the plurality of objects, an update for a given object being applied by interpolating a transformation of the given object from a current position to an updated position.

9. The method of claim 8, wherein the interpolation is configured to arrive at the updated position at approximately an expected time of a next update.

10. A video game system, comprising at least one server computer for hosting a server-based video game, the server computer including a processor, wherein the plurality of objects includes two or more classes of objects, the server computer being configured to perform the following operations:
   receive, over a network, an update locus from a remote client device, the update locus indicating a client-specified position, that is determined by the remote client device, within the virtual space of the server-implemented video game;
   determine, by the server-based video game, respective distances of each of the plurality of objects from the update locus in the virtual space;
   determine an update rate profile for each class of objects, the update rate profile indicating the update rate of a given object based on the given object's ranked order within the class as determined by its distance from the update locus;
   for each class of objects, sort the objects of the class according to their determined distances from the update locus;
   determine, by the server-based video game, an update rate for each of the plurality of objects based upon its class and update rate profile, the update rate for a given one of the plurality of objects defining a frequency with which updates regarding the given one of the plurality of objects are sent from the server computer to the remote client device that provided the update locus;
   send updates over the network regarding each of the plurality of objects, from the server computer to the remote client device, according to the determined update rates, so that updates are sent from the server computer to the remote client device using at least two different update rates for each of at least two of the plurality of objects, respectively, during an update, the determined update rates being applied to the plurality of objects to provide a representation on a display in communication with the remote client device.

11. The video game system of claim 10, wherein determining an update rate further includes:
   dividing the objects in a given one of the classes of objects into consecutive non-overlapping cohorts;
   determining, for each cohort, a single update rate to apply to each object in the cohort, such that the update rate decreases as distance of the cohort from the update locus increases.

12. The video game system of claim 10, wherein the client-specified position is the position of a first-person character or a third-person character of a player of the video game.

13. The video game system of claim 10, wherein the client-specified position is the position of a point of interest of a player of the video game.

14. The video game system of claim 10, wherein the operation of sending updates further includes sending an update for a given object according to its determined update rate only when the given object exhibits a changed status from the status of its previously sent update.

15. A computer program product for providing updates to a remote client device regarding a plurality of objects located in a virtual space of a video game that is executed by a server computer, wherein the plurality of objects includes two or more classes of objects, the computer program product being embodied on a non-transitory computer-readable medium, the computer program product configured for execution by the server computer, comprising:
   program instructions for receiving, over a network by the server computer, an update locus from the remote client, the update locus indicating a client-specified position within the virtual space of the server-implemented video game;
   program instructions for determining, by the server-implemented video game, respective distances of each of the plurality of objects from the update locus in the virtual space;
   program instructions for determining an update rate profile for each class of objects, the update rate profile indicating the update rate of a given object based on the given object's ranked order within the class as determined by its distance from the update locus;
   program instructions for, for each class of objects, sorting the objects of the class according to their determined distances from the update locus;
   program instructions for determining, by the server-implemented video game, an update rate for each of the plurality of objects based upon its class and update rate profile, the update rate for a given one of the plurality of objects defining a frequency with which updates regarding the given one of the plurality of objects are sent from the server computer to the remote client device that provided the update locus;
   program instructions for sending updates over the network regarding each of the plurality of objects, from the server computer to the remote client device, according to the determined update rates, so that updates are sent from the server computer to the remote client device using at least two different update rates for each of at least two of the plurality of objects, respectively, during an update, the determined update rates being applied to the plurality of objects to provide a representation on a display in communication with the remote client device.

16. The computer program product of claim 15, wherein the determining an update rate further includes:
   dividing the objects in a given one of the classes of objects into consecutive non-overlapping cohorts;
   determining, for each cohort, a single update rate to apply to each object in the cohort, such that the update rate decreases as distance of the cohort from the update locus increases.

17. The computer program product of claim 15, wherein the client-specified position is the position of a first-person character or a third-person character of a player of the video game.

18. The computer program product of claim 15, wherein the client-specified position is the position of a point of interest of a player of the video game.

19. The computer program product of claim 15, wherein the program instructions for sending updates further includes program instructions for sending an update for a given object according to its determined update rate only when the given object exhibits a changed status from the status of its previously sent update.

* * * * *